United States Patent
Kim et al.

(10) Patent No.: US 10,097,678 B2
(45) Date of Patent: Oct. 9, 2018

(54) APPARATUS AND METHOD FOR GENERATING GROUP PROFILE

(71) Applicant: Samsung Electronics Co., Ltd, Gyeonggi-do (KR)

(72) Inventors: Young-Ri Kim, Gyeonggi-do (KR); Doo-Suk Kang, Gyeonggi-do (KR); Eun-Sun Kim, Seoul (KR); Jin-A Lee, Seoul (KR); Young-Ho Rhee, Gyeonggi-do (KR); Cheol-Kyu Lim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/275,269

(22) Filed: Sep. 23, 2016

(65) Prior Publication Data

US 2017/0085691 A1    Mar. 23, 2017

(30) Foreign Application Priority Data

Sep. 23, 2015    (KR) ........................ 10-2015-0134838

(51) Int. Cl.
*H04M 1/00* (2006.01)
*H04M 1/2745* (2006.01)
*H04M 1/725* (2006.01)

(52) U.S. Cl.
CPC . *H04M 1/274508* (2013.01); *H04M 1/27455* (2013.01); *H04M 1/274516* (2013.01); *H04M 1/274533* (2013.01); *H04M 1/72519* (2013.01)

(58) Field of Classification Search
None
See application file for complete search history.

(56) References Cited

U.S. PATENT DOCUMENTS

| | | | |
|---|---|---|---|
| 2011/0207440 A1* | 8/2011 | Ruuspakka | H04W 4/08 455/414.1 |
| 2011/0307932 A1* | 12/2011 | Fan | H04N 21/2547 725/110 |
| 2013/0132865 A1* | 5/2013 | Li | H04L 51/20 715/758 |

FOREIGN PATENT DOCUMENTS

KR    10-2015-0026353    3/2015

\* cited by examiner

*Primary Examiner* — Mohammed Rachedine

(57) ABSTRACT

One or more embodiments of this disclosure provide an apparatus and a method for generating a group profile. The apparatus receives, from a first external device, a request for generating a set of first information related to a group including a plurality of users using different electronic devices through the communication module. The apparatus receives, from the first external device or a second external device, a set of second information related to at least some of the plurality of users in response to the received request. The apparatus generates first data including the set of first information and second data for at least a part of at least one user interface corresponding to the set of first information based on at least some of the received set of second information. The apparatus transmits the first data or the second data to the first external device through the communication module.

20 Claims, 27 Drawing Sheets

| INFORMATION CLASSIFICATION | PROFILE INFORMATION | FIRST USER | | SECOND USER | | THIRD USER (ME) | | FOURTH USER | |
|---|---|---|---|---|---|---|---|---|---|
| | | | MAKE INFORMATION PUBLIC OR NOT | | MAKE INFORMATION PUBLIC OR NOT | | MAKE INFORMATION PUBLIC OR NOT | | MAKE INFORMATION PUBLIC OR NOT |
| BASIC INFORMATION | NAME | KIM SAMSUNG | Public | LEE YUREE | Public | KIM YUMI | Public | KIM HOON | Public |
| | PROFILE PHOTO | | Public | | Public | | Public | | Public |
| | STATE MESSAGE | Bravo my life | Public | Happy life | Public | Friday night | Public | Snow boarding | Public |
| | PHONE NUMBER | 010-1111-1234 | Public | 010-2222-1234 | Public | 010-3333-1234 | Public | 010-4444-1234 | Public |
| EXTENDED INFORMATION | EMAIL | xx@Samsung.com | Selected only | xx@naver.com | Selected only | xx@gmail.com | Public | xx@universityl.com | Selected only |
| | ADDRESS | DAECH-DONG SAMSUNG APT. 101-1201 | Selected only | DAECH-DONG SAMSUNG APT. 101-1201 | Selected only | DAECH-DONG SAMSUNG APT. 101-1201 | Selected only | DAECH-DONG SAMSUNG APT. 101-1201 | Selected only |
| | AFFILIATION | SAMSUNG ELECTRONICS | Public | CEO OF XX CORPORATION | Public | SAMSUNG CONSULTING | Public | SEOUL NATIONAL UNIVERSITY | Public |
| | RELATION | YUMI'S FATHER | Selected only | YUMI'S MOTHER | Selected only | ME | Selected only | YUMI'S YOUNGER BROTHER | Selected only |
| | ANNIVERSARY/BIRTHDAY | 1956.1.12 | Public | 1958.5.8 | Public | 1980.12.30 | Selected only | 1993.7.5 | Public |
| | ACCOUNT NUMBER | HANKUK BANK xxx-xxx | Selected only | HANKUK BANK xxx-xxx | Selected only | KOREA EXCHANGE BANK xxx-xxxx | Selected only | NONGHYUP xxx-xxxx | Selected only |
| | INTEREST | GOLF | Public | GOLF | Public | CLUB | Public | SNOW BOARD | Public |
| STATE INFORMATION | PRESENCE | OFFICE | Selected only | DRIVING | Selected only | BUSINESS TRIP | Public | MOVING | Selected only |
| | LOCATION | GANGNAM | Selected only | GANGNAM | Selected only | NEW YORK | Public | HAEUNDAE | Selected only |
| | WEATHER | SUNNY | Public | SUNNY | Public | CLOUDY | Public | SUNNY | Public |

FIG.11

| INFORMATION CLASSIFICATION | | FIRST USER | | SECOND USER | | THIRD USER (ME) | | FOURTH USER | |
|---|---|---|---|---|---|---|---|---|---|
| | | | MAKE INFORMATION PUBLIC OR NOT | | MAKE INFORMATION PUBLIC OR NOT | | MAKE INFORMATION PUBLIC OR NOT | | MAKE INFORMATION PUBLIC OR NOT |
| BASIC INFORMATION | NAME | Melisa | Public | Sam | Public | John | Public | Tiger | Public |
| | PROFILE PHOTO |  | Public |  | Public | | Public | | Public |
| | STATE MESSAGE | It's rainy day | Public | Always Smile! | Public | Hello | Public | Cheer UP! | Public |
| | PHONE NUMBER | 010-9999-1234 | Public | 010-8888-1234 | Public | 010-6666-1234 | Public | 010-7777-1234 | Public |
| EXTENDED INFORMATION | EMAIL | xx@Samsung.com | Public | xx@Samsung.com | Public | xx@Samsung.com | Public | xx@Samsung.com | Public |
| | ADDRESS | Sandi ego xxxx | Selected only | Sandi ego xxxx | Selected only | Sandi ego xxxx | Selected only | Sandi ego xxxx | Selected only |
| | AFFILIATION | SAMSUNG ELECTRONICS, EXPORT DEPARTMENT | Public | SAMSUNG ELECTRONICS, EXPORT DEPARTMENT | Public | SAMSUNG ELECTRONICS, EXPORT DEPARTMENT | Public | SAMSUNG ELECTRONICS, EXPORT DEPARTMENT | Public |
| | RELATION | SENIOR | Public | SUPERIOR | Public | ME | Selected only | SENIOR | Public |
| | ANNIVERSARY/ BIRTHDAY | 1982.1.12 | Selected only | 1980.5.8 | Selected only | 1985.12.30 | Selected only | 1993.7.5 | Selected only |
| | ACCOUNT NUMBER | ALPHA BANK xxx-xxx | Selected only | ALPHA BANK xxx-xxx | Selected only | ALPHA BANK xxx-xxx | Selected only | BETA BANK xx-xxxx | Selected only |
| | INTEREST | CYCLE | Selected only | CONCERT | Selected only | TRAVEL | Public | SNOW BOARD | Selected only |
| STATE INFORMATION | PRESENCE | BUSINESS TRIP | Public | BUSINESS TRIP | Public | BUSINESS TRIP | Public | BUSINESS TRIP | Public |
| | LOCATION | LONDON | Public | LONDON | Public | NEW YORK | Public | NEW YORK | Public |
| | WEATHER | CLOUDY | Public | CLOUDY | Public | CLOUDY | Public | CLOUDY | Public |

FIG.13

FATHER
MOTHER
Family  YOUNGER BROTHER
BIRTHDAY
ME

Member since : 09/01/2012

Address : Seoul, in Korea

Father   Mother   Me   Brother

Shared Photo :

Payment :

XX Bank : XXX-XXX-XXX

XX Bank : XXX-XXX-XXX

XX Bank : XXX-XXX-XXX

| Profile | Specialized |

| RECOMMENDED INFORMATION | GROUP TYPE | | FAMILY | |
|---|---|---|---|---|
| | KIND OF GROUP | DIRECT LINE | FAMILY OF SPOUSE | SECOND MARRIAGE |
| PROFILE INFORMATION | Name | Family Name | Spouse's Family name | Family name |
| | Relationship | Parents, Father, Mother, Sister, Brother, Child, Spouse, Relative | Custom(Father in-laws,...) | Custom(Step mother,...) |
| | Address | Home address | Home address | Home address |
| | Mobile/Phone | Home phone | Home phone | Home phone |
| | Department | | | |
| | Job title | | | |
| | Organization | | | |
| | Email | | | |
| | Birthday | | | |
| | Anniversary | WEDDING ANNIVERSARY | WEDDING ANNIVERSARY | WEDDING ANNIVERSARY |
| | WiFi | AP ADDRESS ACCESSED AT A PARTICULAR TIME ZONE | | |
| | Call | - Call Parsing (ANALYSIS OF APPELLATION DURING CHATTING) | - Call Parsing (ANALYSIS OF APPELLATION DURING CHATTING) | - Call Parsing (ANALYSIS OF APPELLATION DURING CHATTING) |
| | S Planner | Event(Appointment) | Event(Appointment) | Event(Appointment) |
| | Message | - Instant chatting group - Message Parsing (ANALYSIS OF APPELLATION DURING CHATTING) | - Instant chatting group - Message Parsing (ANALYSIS OF APPELLATION DURING CHATTING) | - Instant chatting group - Message Parsing (ANALYSIS OF APPELLATION DURING CHATTING) |
| NATIVE APPLICATION LINK | Gallery | FACE RECOGNIZED PHOTO SAME PHOTO (TAKEN BY ONE OF GROUP MEMBERS) | | |
| | S Health | | | |
| | PenUp | | | |
| | Knox | | | |
| | Email (Naver,Inbox...) | | | |
| APPLICATION | 3rd App | - SNS GROUP LINK - Instant chatting group | - SNS GROUP LINK - Instant chatting group | - SNS GROUP LINK - Instant chatting group |
| COMMUNICATION LOG | Call/Message Frequency | GRASP INTIMACY | GRASP INTIMACY | GRASP INTIMACY |

| RECOMMENDED INFORMATION | KIND OF GROUP | GROUP TYPE | | | |
|---|---|---|---|---|---|
| | | OFFICE | | FRIEND | |
| | | COLLEAGUE | CUSTOMER/PARTNER | SCHOOL FRIEND | FRIEND |
| PROFILE INFORMATION | Name | | | | FRIEND HAVING THE SAME INTEREST |
| | Relationship | Colleague, Manager, Assistant | Partner, Domestic Partner | Friends, Custom (University Friends, ...) | Friends, Custom (Swimming, ...) |
| | Address | Work Address | Work Address | University address | |
| | Mobile/Phone | Work phone | Work phone | University phone | |
| | Department | Company Department | Company Department | | |
| | Job title | Job title | Job title | Major | |
| | Organization | Company name | Company name | University name | |
| | Email | Work Email | Work Email | University Email | |
| | Birthday | | | | |
| | Anniversary | ANNIVERSARY OF THE FOUNDING | ANNIVERSARY OF THE FOUNDING | ANNIVERSARY OF FOUNDATION OF SCHOOL SAME AGE | WEDDING ANNIVERSARY |
| NATIVE APPLICATION LINK | WiFi | AP ADDRESS ACCESSED AT A PARTICULAR TIME ZONE | AP ADDRESS ACCESSED AT A PARTICULAR TIME ZONE | AP ADDRESS ACCESSED AT A PARTICULAR TIME ZONE | WEDDING ANNIVERSARY |
| | Call | - Call Parsing (ANALYSIS OF APPELLATION DURING CHATTING) | - Call Parsing (ANALYSIS OF APPELLATION DURING CHATTING) (CALL WITH PERSON HAVING BIZ PROFILE) | - Call Parsing (ANALYSIS OF APPELLATION DURING CHATTING) | (ANALYSIS OF APPELLATION DURING CHATTING) |
| | S Planner | Event(Meeting) | Event(Meeting) | Event(Appointment) | Event(Appointment) |
| | Message | - Instant chatting group - Message Parsing (ANALYSIS OF APPELLATION DURING CHATTING) | - Instant chatting group - Message Parsing (ANALYSIS OF APPELLATION DURING CHATTING) | - Instant chatting group - Message Parsing (ANALYSIS OF APPELLATION DURING CHATTING) | - Instant chatting group - Message Parsing (ANALYSIS OF APPELLATION DURING CHATTING) |
| | Gallery | | | FACE RECOGNIZED PHOTO SAME PHOTO (TAKEN BY ONE OF GROUP MEMBERS) | |
| | S Health | | | | Interest - PERSON HAVING THE SAME ACTIVITY LEVEL |
| | PenUp | | | | - Interest - GROUP LINK (SCHEDULED TO BE ADDED IN 2 MONTHS) |
| APPLICATION | Knox | GROUP LINK (REQUIRING SETTINGS) | GROUP LINK (REQUIRING SETTINGS) | | |
| | Email (Naver, Inbox...) | RECEIVING/SENDING LIST OF PARTICULAR EMAIL | RECEIVING/SENDING LIST OF PARTICULAR EMAIL | RECEIVING/SENDING LIST OF PARTICULAR EMAIL | |
| | 3rd App | - SNS GROUP LINK - Instant chatting group | - SNS GROUP LINK - Instant chatting group | - SNS GROUP LINK - Instant chatting group | - SNS GROUP LINK - Instant chatting group |
| COMMUNICATION LOG | Call/Message Frequency | GRASP INTIMACY | GRASP INTIMACY | GRASP INTIMACY | GRASP INTIMACY |

FIG.23B

APPARATUS AND METHOD FOR GENERATING GROUP PROFILE

CROSS-REFERENCE TO RELATED APPLICATION(S) AND CLAIM OF PRIORITY

The present application is related to an claims priority under 35 U.S.C. § 119(a) to Korean Application Serial No. 10-2015-0134838, which was filed in the Korean Intellectual Property Office on Sep. 23, 2015, the entire content of which is hereby incorporated by reference.

TECHNICAL FIELD

The present disclosure relates to generation of a group profile.

BACKGROUND

In general, a user may generate profiles for users included in a contact list as well as a personal profile and use various functions of a portable terminal by using the generated profiles. For example, when the user sets an image registered in a profile of a particular user as a call screen image of the particular user, the portable terminal may display the set image on a screen of the portable terminal when the user calls the particular user or receives a call from the particular user.

Further, when adding a contact of the particular user through the portable terminal, the user may select a group name provided in the portable terminal or a group name, which is set by the user, and add or generate a member of a group corresponding to the selected group name.

Further, the user may execute an application that provides a Social Network Service (SNS) through the portable terminal, make a personal profile on the SNS through the executed application, and make the personal profile public to various users. For example, the user may register an image stored in the portable terminal as the personal profile image on the SNS by using the portable terminal.

Recently, various applications using personal profile information are provided and thus the user may share the personal profile information with various users and use a service related to the profile information with the users with which the profile information is shared.

SUMMARY

Various embodiments of the present disclosure provide an apparatus and a method for generating a group profile.

In accordance with an aspect of the present disclosure, an electronic device is provided. The electronic device includes: a communication module; a processor electrically connected to the communication module; and a memory electrically connected to the processor, wherein the memory is configured to store instructions, that when executed, instruct the processor to: receive, from a first external device, a request for generating a set of first information related to a group including a plurality of users using different electronic devices through the communication module, receive, from the first external device or a second external device, a set of second information related to at least some of the plurality of users, generate first data, including the set of first information, and second data for at least a part of at least one user interface corresponding to the set of first information based on at least some of the received set of second information, and transmit the first data or the second data to the first external device through the communication module.

In accordance with another aspect of the present disclosure, an electronic device is provided. The electronic device includes: at least one communication module; a display; a processor electrically connected to the at least one communication module and the display; and a memory electrically connected to the processor, wherein the memory is configured to store instructions, that when executed, instruct the processor to: transmit a request for generating a group profile of a plurality of users who use different electronic devices to an external device through the at least one communication module, transmit personal profiles of at least some of the plurality of users to the external device through the at least one communication module, receive data related to at least one user interface corresponding to the group profile of the plurality of users generated at least based on some of the transmitted personal profiles from the external device through the communication module, and display a user interface based on at least some of the received data on the display.

In accordance with another aspect of the present disclosure, an electronic device is provided. The electronic device includes: a communication module; a processor electrically connected to the communication module; and a memory electrically connected to the processor, wherein the memory is configured to store instructions, that when executed, instruct the processor to: receive a request, for personal profiles of at least some of a plurality of users that use different electronic devices, from a first external device through the communication module, retrieve a personal profile, stored in the memory, from among at least some personal profiles, transmit the personal profile to the first external device or a second external device, and receive data, corresponding to a group profile of the plurality of users and generated based on the transmitted personal profile, from the first external device or the second external device.

In accordance with another aspect of the present disclosure, a method of providing a group profile is provided. The method includes: receiving a request for generating a set of first information related to a group including a plurality of users who use different electronic devices from a first external device; receiving a set of second information related to at least some of the plurality of users from the first external device or a second external device; generating first data including the set of first information or second data for at least some of at least one user interface corresponding to the set of first information based on at least some of the received set of second information; and transmitting the first data or the second data to the first external device.

In accordance with another aspect of the present disclosure, a method of providing a group profile is provided. The method includes: transmitting a request for generating a group profile of a plurality of users who use different electronic devices to an external device; transmitting personal profiles of at least some of the plurality of users to the external device; receiving data related to at least one user interface corresponding to the group profile of the plurality of users generated based on at least some of the transmitted personal profiles from the external device; and displaying the user interface based on at least some of the received data on the display.

In accordance with another aspect of the present disclosure, a method of providing a group profile is provided. The method includes: receiving a request for personal profiles of at least some of a plurality of users who use different electronic devices from a first external device; retrieving a personal profile stored in a memory, from among at least some of the personal profiles; transmitting the personal profile to the first external device or a second external device; and receiving data, corresponding to a group profile of the plurality of users and generated based on the transmitted personal profile, from the first external device or the second external device.

According to various embodiments of the present disclosure, a group profile is generated by collecting information related to a group from group members, such that a user can receive various pieces of information on the group.

According to various embodiments of the present disclosure, even though the user does not accurately recognize information on members of each group, the user can receive desired information since a group profile is generated based on information acquired from the members of each group.

According to various embodiments of the present disclosure, even though members of the group do not individually generate group profiles, the group members can receive optimum group profiles.

According to various embodiments of the present disclosure, various group services can be provided through group profiles generated between group members.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 11 to 12 illustrate examples for generating a group profile of a family group according to various embodiments;

FIGS. 13 to 14 illustrate examples for generating a group including different users associated with the user based on state information of the user and generating a group profile of the generated group according to various embodiments;

FIGS. 16 to 22 illustrate examples showing user interfaces including detailed information of group profiles according to various embodiments;

FIGS. 23A and 23B illustrate examples of group relation information used to generate a group according to various embodiments.

DETAILED DESCRIPTION

Figure 1:
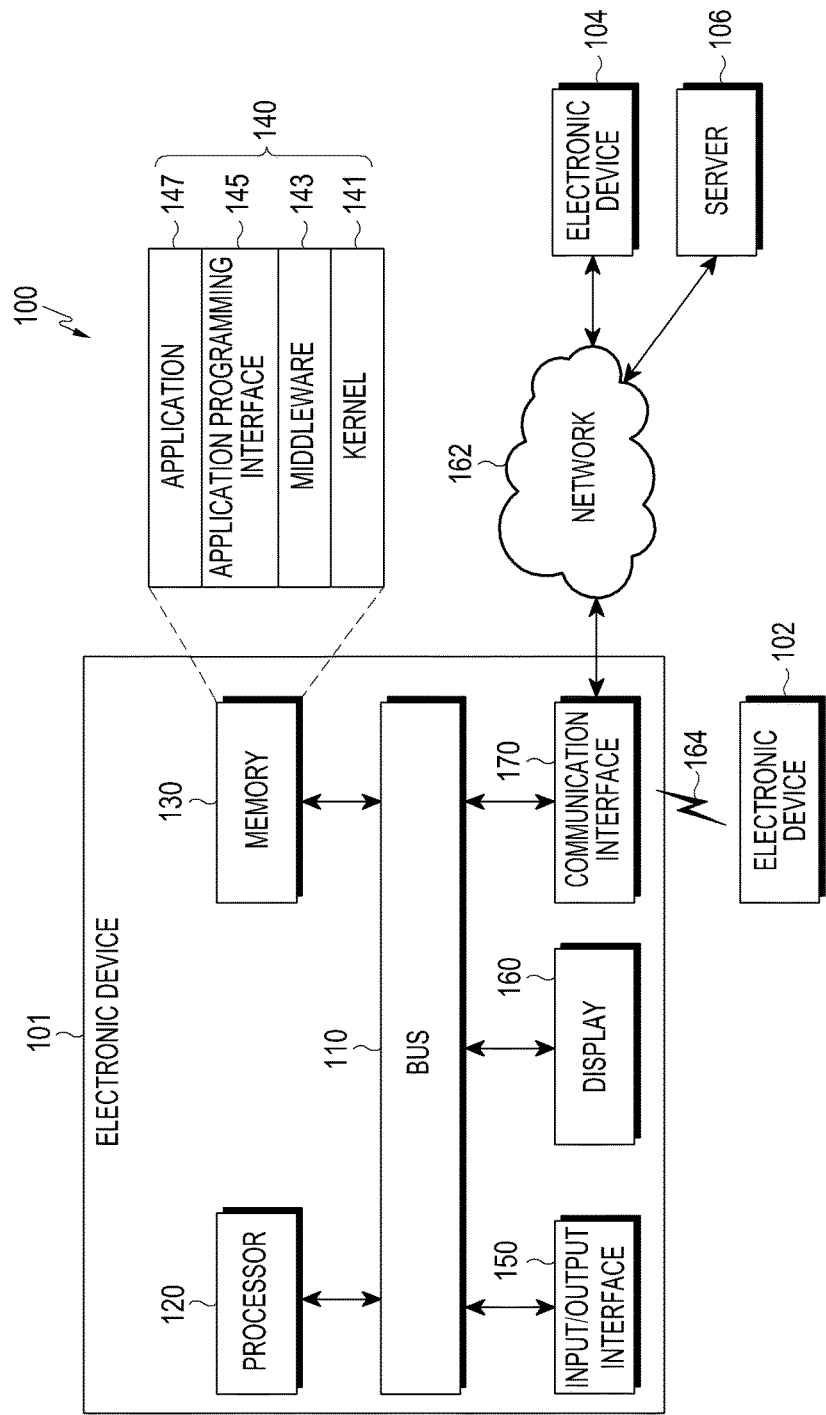
FIG. 1 illustrates a network environment including an electronic device, according to various embodiments.

FIGS. 1 through 26B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device or method.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some examples, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, and the like), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, and the like).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In the present disclosure, the term "user" may indicate a person using an electronic device or a device (e.g., an artificial intelligence electronic device) using an electronic device.

A user may generate a personal profile through a portable terminal, generate a group or a group profile, and use the generated profiles.

However, when generating a profile of a particular user or a group profile of a group in a portable terminal, the terminal user may register only information such as a user name, contact, email, group name, ringtone, message notification sound, and member addition. Further, since the portable terminal simply lists and displays registered information, the portable terminal has difficulty in providing various pieces of information on a group and expressing a characteristic.

When generating the group profile, the user may not input group profile information due to inconvenience of the input. When the user cannot accurately recognize information on individuals within the group, the user has difficulty in inputting accurate information on the group, such that there is a limitation in providing group profile information.

One or more embodiments of this disclosure provide a method of securing user's convenience and generating and using a group profile to which information on the group is accurately reflected when the group profile is generated.

FIG. 1 illustrates an electronic device 101 in a network environment 100 according to various embodiments. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for connecting the elements 110 to 170 and transmitting communication (for example, control messages and/or data) between the components.

The processor 120 may include one or more of a Central Processing Unit (CPU), an Application Processor (AP), and a Communication Processor (CP). For example, the processor 120 may carry out operations or data processing relating to the control and/or communication of at least one other element of the electronic device 101. The processor 120 may be called a controller, or may include a controller as a part thereof or constitute a part of the controller.

According to an embodiment, the processor 120 may acquire group relation information used for a group profile according to a group profile generation request and generate the group profile based on the acquired group relation information.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

According to an embodiment, the memory 130 may store a personal profile, group information, group relation information used to generate a group profile, and the group profile.

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, and the like) of the electronic device 101 to one or more of the application programs 147. For example, the middleware 143 may perform scheduling or load balancing on the one or more task requests by processing the one or more task requests according to the priorities assigned to the one or more application programs.

The API 145, which is an interface through which the applications 147 control functions provided from the kernel 141 or the middleware 143, may include, for example, at least one interface or function (for example, instruction) for file control, window control, image processing, text control, and the like.

The input/output interface 150 may function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of contents (for example, text, images, videos, icons, or symbols) to the user. The display 160 may include a touch screen and may receive, for example, a touch, gesture, proximity, or hovering input using an electronic pen or the user's body part.

According to an embodiment, the display 160 may display a user interface for the group profile.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

According to an embodiment, the communication interface 170 may receive a personal profile or/and a group profile from an external device (for example, first external electronic device 102, second external electronic device 104, or server 106) or transmit the personal profile or/and the group profile to the external device.

According to an embodiment, the communication interface 170 may transmit group relation information used to generate the group profile to the external device or receive the group relation information from the external device.

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short range communication 164. The short range communication 164 may include, for example, at least one of Wi-Fi, Bluetooth, Near Field Communication (NFC), Global Navigation Satellite System (GNSS), and the like. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of communication networks such as a computer network (for example, a LAN or a WAN), the Internet, and a telephone network.

Each of the first and second external electronic devices 102 and 104 may be of a type identical to or different from that of the electronic device 101.

According to an embodiment, at least one of the first and second external electronic devices 102 and 104 may be a device that performs an operation for generating a group profile or a device that manages a group profile.

According to an embodiment, at least one of the first and second external electronic devices 102 and 104 may be a device that makes a request for generating a group profile.

According to an embodiment, the server 106 may include a group of one or more servers.

According to an embodiment, the server 106 may be a device that performs an operation for generating a group profile or a device that manages a group profile.

According to various embodiments, all or some of the operations executed by the electronic device 101 may be executed by another electronic device, a plurality of electronic devices (for example, the electronic devices 102 and 104), or the server 106.

According to an embodiment, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic device (for example, the electronic device 102 or 104, or the server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
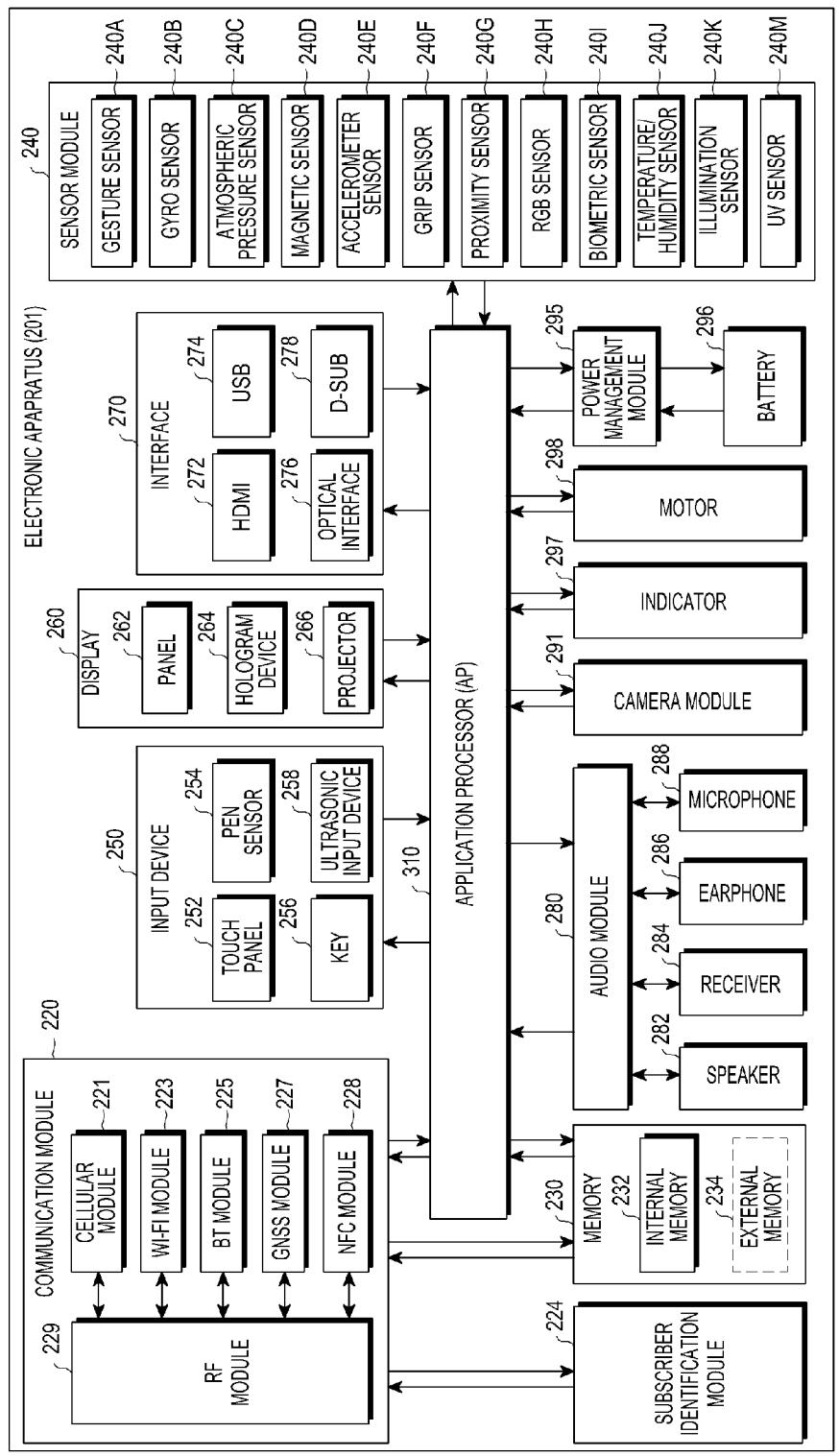
FIG. 2 illustrates a block diagram of an electronic device according to various embodiments.

FIG. 2 illustrates a block diagram of an electronic device according to various embodiments. The electronic device 201 may include, for example, the entirety or a part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or application programs to control a plurality of hardware or software elements connected thereto and may perform various types of data processing and operations. The processor 210 may be embodied, for example, as a System on Chip (SoC). According to an embodiment, the processor 210 may further include a Graphic Processing Unit (GPU) and/or an image signal processor. The processor 210 may also include at least some (for example, a cellular module 221) of the elements illustrated in FIG. 2. The processor 210 may load, in a volatile memory, instructions or data received from at least one of the other elements (for example, a non-volatile memory) to process the loaded instructions or data, and may store various types of data in the non-volatile memory.

The communication module 220 may have a configuration identical or similar to that of the communication interface 170 illustrated in FIG. 1. The communication circuit 220 may include, for example, a cellular module 221, a Wi-Fi module 223, a BT module 225, a GNSS module 227 (for example, a GPS module, a Glonass module, a Beidou module, or a Galileo module), an NFC module 228, and a Radio Frequency (RF) module 229.

The cellular module 221 may provide, for example, a voice call, a video call, a text message service, an Internet service, and the like through a communication network. According to an embodiment of the present disclosure, the cellular module 221 may identify or authenticate an electronic device in the communication network by using the subscriber identification module (for example, a Subscriber Identity Module (SIM) card) 224. According to an embodiment, the cellular module 221 may perform at least some of the functions that the AP 210 may provide. According to an embodiment, the cellular module 221 may include a Communication Processor (CP).

For example, each of the Wi-Fi module 223, the BT module 225, the GPS module 227, and the NFC module 228 may include a processor for processing data transmitted/received through the corresponding module. In some embodiments, at least some (two or more) of the cellular module 221, the Wi-Fi module 223, the Bluetooth module 225, the GNSS module 227, and the NFC module 228 may be included in a single Integrated Chip (IC) or IC package.

The RF module 229, for example, may transmit/receive a communication signal (for example, an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the Bluetooth module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory, a NOR flash memory, and the like), a hard disc drive, a Solid State Drive (SSD), and the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input unit 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264 or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three-dimensional image in the air using an interference of light. The projector 266 may display an image by projecting light onto a screen. The screen may be located, for example, in the interior of, or on the exterior of, the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like.

The camera module 291 is, for example, a device that can photograph a still image and a video. According to an embodiment, the camera module 291 may include one or more image sensors (for example, a front sensor or a back sensor), a lens, an Image Signal Processor (ISP), or a flash (for example, an LED or xenon lamp).

The power management module 295 may manage, for example, the power of the electronic device 201. According to an embodiment, the power management module 295 may include a Power Management Integrated Circuit (PMIC), a charger Integrated Circuit (IC), or a battery 296 or fuel gauge. The PMIC may have a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, and the like. Although not illustrated, the electronic device 201 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
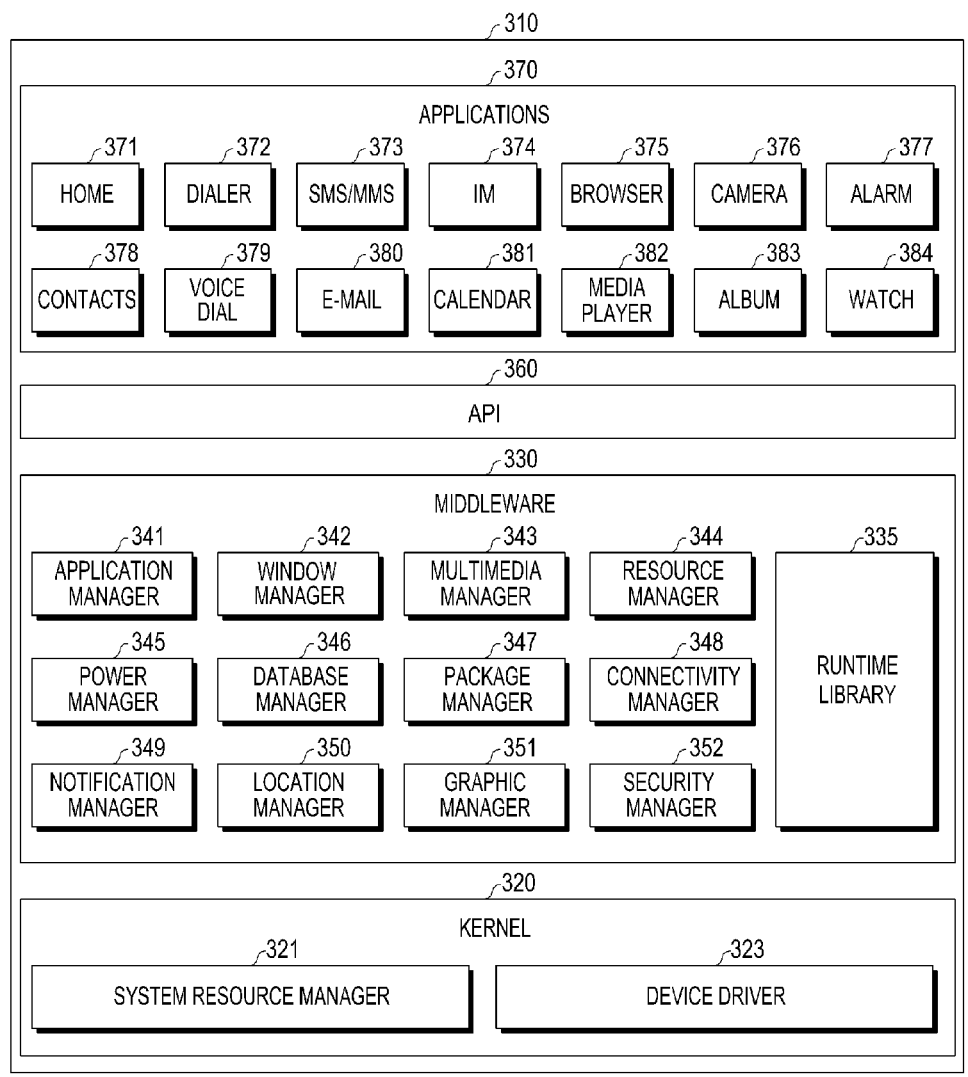
FIG. 3 illustrates a block diagram of a programming module according to various embodiments.

FIG. 3 illustrates a block diagram of a program module according to various embodiments. According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android®, iOS®, Windows®, Symbian®, Tizen®, Bada®, or the like.

The program module 310 may include a kernel 320, middleware 330, an Application Programming Interface (API) 360, and/or applications 370. At least some of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or retrieve system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function used by the applications 370 in common, or may provide various functions to the applications 370 through the API 360 such that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, and the like.

The application manager 341 may, for example, manage a life cycle of at least one of the applications 370. The window manager 342 may manage Graphical User Interface (GUI) resources used on a screen. The multimedia manager 343 may determine a format used to reproduce various media files, and may encode or decode a media file by using a coder/decoder (codec) appropriate for the corresponding format. The resource manager 344 may manage resources, such as the source code, the memory, the storage space, and the like of at least one of the applications 370.

The power manager 345 may operate together with, for example, a Basic Input/Output System (BIOS) to manage a battery or power and provide power information used for the operation of the electronic device. The database manager 346 may generate, search, and/or change a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The notification manager 349 may display or notify of an event, such as an arrival message, an appointment, a proximity notification, and the like, in such a manner as not to disturb a user. The location manager 350 may manage location information of the electronic device. The graphic manager 351 may manage a graphic effect to be provided to a user and a user interface relating to the graphic effect. The security manager 352 may provide various security functions used for system security, user authentication, and the like. According to an embodiment, when the electronic device (for example, the electronic device 101) has a telephone call function, the middleware 330 may further include a telephony manager that manages a voice or video call function of the electronic device.

The middleware 330 may include a middleware module that forms a combination of various functions of the above-described elements. The middleware 330 can provide modules specialized according to types of operating systems in order to provide differentiated functions. Furthermore, the middleware 330 may dynamically remove some of the existing elements, or may add new elements.

The API 360 (for example, the API 145) is a set of API programming functions and may be provided with a different configuration according to operating systems. For example, with respect to each platform, one API set may be provided when using Android® or iOS®, and two or more API sets may be provided when using Tizen®.

The applications 370 (for example, the application programs 147) may include one or more applications that can perform functions, for example, home 371, dialer 372, SMS/MMS 373, Instant Message (IM) 374, browser 375, camera 376, alarm 377, contacts 378, voice dial 379, e-mail 380, calendar 381, media player 382, album 383, watch 384, health care (for example, measuring exercise quantity or blood sugar), and environment information (for example, atmospheric pressure, humidity, temperature information, and the like).

According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information that is generated from the other applications (for example, the SMS/MMS application, the e-mail application, the health care application, the environmental information application, and the like) of the electronic device. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 370 may include applications (for example, a health care application of a mobile medical appliance, and the like) designated according to the attributes of an external electronic device (for example, the electronic device 102 or 104). According to an embodiment, the applications 370 may include applications received from an external electronic device (for example, the server 106 or the electronic device 102 or 104). According to an embodiment, the applications 370 may include a preloaded application or a third party application that may be downloaded from a server. The names of the components of the program module 310 according to the illustrated embodiment may vary according to the type of operating system.

According to various embodiments, at least a part of the programming module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Figure 4:
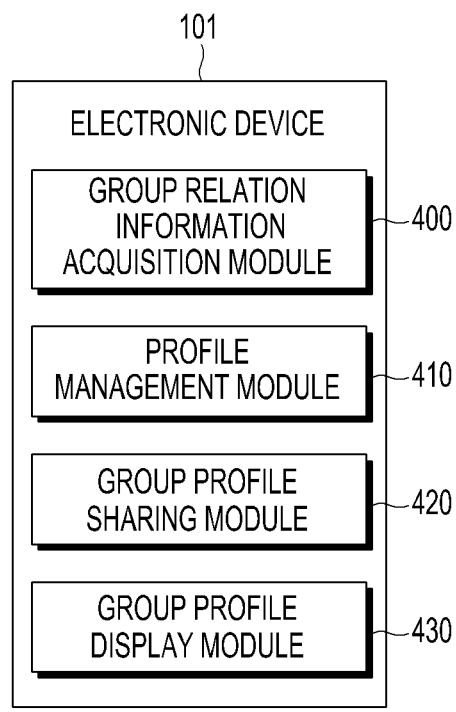
FIG. 4 illustrates a block diagram of an electronic device that generates a group profile according to various embodiments.

FIG. 4 illustrates a block diagram illustrating an electronic device that generates a group profile according to various embodiments.

According to FIG. 4, the electronic device 101 may include a group relation information acquisition module 400, a profile management module 410, a group profile sharing module 420, and a group profile display module 430.

The group relation information acquisition module 400 may acquire group relation information used to generate and update a group profile.

According to an embodiment, the group profile may be first data including a set of first information related to a group including a plurality of users who use different electronic devices.

According to an embodiment, the group relation information may be a set of second information related to at least some of the plurality of users.

According to an embodiment, the group relation information may include group information such as such as a group name, a category, and a relationship, and group member information such as personal profile information of a group member, presence information, a contact list, and application log information.

For example, the personal profile information may be configured as shown in Table 1 below.

TABLE 1

| Classification of Information | Profile information | Public/private |
|---|---|---|
| Basic information | Name | Public |
| | Profile photo | Public |
| | State message | Public |
| | Contact | Private |
| Extended information | Email address | Public |
| | Address | Private |
| | Affiliation | Public |
| | Schedule | Public |
| | Anniversary/Birthday | Public |
| | Shared file (photo or document) | Private |
| | Frequently used contact means | Public |
| | SNS | Public |
| | Account | Private |
| | Interest | Public |
| State information | presence | Public |
| | Location | Public |
| | Weather | Public |

According to an embodiment, the group member information of the group relation information may include contact-based basic information such as a group member name, a profile photo, a state image, and a contact, extended information such as an email address, an address, an affiliation schedule, an anniversary/birthday, a shared file (photo or document), a frequently used means for contact, SNS, an account, and interest, and state information such as a location, weather, and presence. For example, the group relation information may be configured as shown in Table 2 below.

TABLE 2

| Group relation information | |
|---|---|
| Information type | Detailed information |
| Name information | Basic name (Name prefix, First name, Middle name, Last name, Name suffix) |
| | Called name (Phonetic first name, Phonetic middle name, Phonetic last name) |
| | Nickname |
| Affiliation information | Office (or School) name |
| | Job name (or major) |
| Phone number information | Mobile number, home number, office number, home fax number, office fax number, fax number, beeper number, reply number, and the like |
| Email information | Home email, office email, and the like |
| Instant message information | AIM, Windows Live, Yahoo, Skype, QQ, Hangouts, ICQ, Jabber, and the like |
| Address information | City, region, country, detailed address, state, and zip code |
| | Home, office, and the like |
| Description information | |
| Website information | |
| Event information | Birthday, wedding anniversary, and other anniversaries |
| State message information | Text message or sticker |
| Image information | Profile image (photo, preset image, avatar, logo, and the like) |
| | Cover image |
| | Avatar |
| | Paper business card |
| | QR code |
| Relationship | Father, mother, parent, brother, sister, child, friend, spouse, partner, assistant, manager, and the like |
| Account information | Application, program, and website account |
| Sex information | Male/female |
| Health information | Height and weight |
| | Activity level - no activity, light activity, normal activity, heavy activity, and very heavy activity |
| | Sleeping hours |
| | Exercise quantity - walking distance, walking hours, and weight training |
| | Eaten food (calorie intake) |
| | Heartrate |
| Language information | Primary language |
| | Secondary language |
| Signature information | Handwriting signature |
| | Text signature |
| Additional work information | Working hour |
| | Job - academic background, career, and skill |
| Interest information | Preferred movie genre, preferred performance genre, preferred food type, interested stock type, interested sport team, and other interest |
| Preferred information | Preferred food, preferred music, preferred movie, and preferred animal |
| | Preferred means of transportation |
| Medical/Emergency information | Blood type, name of disease, medical records, allergy, whether to donate organ, and personal emergency contact |
| Payment information | Bank account, security card, and point card |
| Passport information | Passport number |
| Car information | Driver's license, car information - car model and license plate number |
| Presence information | Available/Not available (blocking mode) |
| Child information | Photo, name, phone number, email, and school |
| Device information | Device name, model name, and Wi-Fi profile |
| Contact information | Frequently used contact |
| Contact group information | Group name (family, friend, and office) and group image |
| Contact history information | Frequently used contact |
| Schedule information | General schedule (date, place, and participant) |
| | Planned travel route and schedule |
| Scrapbook information | Image, link, and text (scrap content type, category, and number) |
| Camera information | Camera photographing (mainly taken photo) |
| Gallery information | Images and videos (mainly taken photo and frequently viewed photo) |
| Music information | Frequently listened music, playlist, and music (mainly listened music and music being listened to) |

TABLE 2-continued

Group relation information

| Information type | Detailed information |
|---|---|
| Video information | Images (movie being watched) |
| Other activity information | Game application (game being played and link within game community) |
| | Web, e-book, magazine application (book, magazine, article, cartoon, and webtoon being read) |
| Home information | Application list - Recently frequently used application |
| | Number of uses, hours of use, and use pattern (used application on every day of week and every time) |

When receiving a group profile generation request from a request device that makes a request for generating a group profile, the group relation information acquisition module 400 may make a request for group relation information to a plurality of electronic devices and receive the requested group relation information from the plurality of electronic devices.

The profile management module 410 may determine whether a group related to the request device having made the request for generating the group profile exits. When the group exists, the profile management module 410 may determine whether a group profile exists. The profile management module 410 may update the group profile based on the acquired group relation information when the group file exists, and may generate the group profile based on the acquired group relation information when the group file does not exist.

Specifically, the profile management module 410 may determine whether a group related to the request device exists. When the group related to the request device exists, the profile management module 410 may determine whether a group profile exists.

When the group profile exists, the profile management module 410 may analyze group relation information acquired from group members corresponding to the group profile and update the group profile according to addition, deletion, and change of the group member, and addition, deletion, and change of group profile attribute information included in the group profile.

When the group profile does not exist, the profile management module 410 may analyze group relation information of group members and determine group profile attribute information. According to an embodiment, the group profile attribute information may be a set of first information related to a group including a plurality of users who use different electronic devices.

When the group related to the request device does not exist, the profile management module 410 may generate the group related to the request device, analyze group relation information of group members of the generated group, and determine group profile attribute information.

According to an embodiment, the group profile attribute information may include group relation information determined by a predetermined condition among the group relation information of the group members. For example, the predetermined condition may be a relationship between group members, a high use frequency between group members, and a similar use pattern between group members.

According to an embodiment, the profile management module 410 may assign a weighted value to each piece of the group relation information according to the predetermined condition and determine at least one piece of group relation information to which a high weighted value is assigned as group profile attribute information. The group profile management module 410 may determine group relation information to which a weighted value larger than or equal to a preset threshold value is assigned as the group relation information to which the high weighted value is assigned.

The group profile attribute information determined as described above may include information that represents group members like relationship-related information such as an anniversary or birthday related to the relationship between group members, common information such as a location between group members, a means for contact, a shared file, a schedule, presence, and weather, and context information such as email, contact, SNS account, account, and application according to a use pattern between group members.

For example, group relation information that assigns a weighted value to an office group a family group, and a friend group may be expressed as shown in Table 3 below.

TABLE 3

| | Group category | | |
|---|---|---|---|
| Information type | Office | Family | Friend |
| Email | 10 | 5 | 6 |
| Contact | 10 | 6 | 6 |
| SNS | 4 | 5 | 10 |
| Anniversary, birthday | 7 | 10 | 9 |
| Schedule | 10 | 6 | 6 |
| Frequently used means for contact | 8 | 10 | 10 |
| Shared file | 10 | 10 | 8 |
| Account information | 5 | 10 | 10 |
| Current location | 5 | 10 | 5 |
| Presence | 10 | 10 | 10 |
| Weather | 5 | 9 | 9 |

Since weighted values of pieces of the group relation information of the office group, the family group, and the friend group are different, different pieces of group profile attribute information may be determined based on the weighted value assigned to respective groups.

For the office group, email and contact that can be used for work may be determined as group profile attribute information. For the family group, a current location and an anniversary may be determined as group profile attribute information. For the friend group, an SNS, a frequently used method of contact, and presence information may be determined as group profile attribute information.

According to an embodiment, the friend group may be specifically classified into a school friend, an office friend, and a neighborhood friend, and different weighted values may be assigned to the school friend, the office friend, and the neighborhood friend according to classified detailed information. For example, the group relation information that assigns the weighted values to the school friend group, the office friend group, and the neighborhood friend group may be configured as shown in Table 4 below.

TABLE 4

| Information type | Group category | | |
|---|---|---|---|
| | School friend | Office friend | Neighborhood friend |
| Email | 10 | 4 | 9 |
| Contact | 10 | 10 | 8 |
| SNS | 10 | 7 | 10 |
| Anniversary, birthday | 7 | 7 | 6 |
| Schedule | 5 | 10 | 10 |
| Frequently used means for contact | 9 | 7 | 7 |
| Shared file | 5 | 7 | 10 |
| Account information | 5 | 5 | 5 |
| Current location | 5 | 5 | 5 |
| Presence | 5 | 10 | 9 |
| Weather | 5 | 8 | 5 |

Since weighted values of pieces of the group relation information of the school friend group, the office friend group, and the neighborhood friend group are different, different pieces of group profile attribute information may be determined based on the weighted value assigned to respective groups.

For the school friend group, email, contact, and SNS related to information exchange may be determined as group profile attribute information. For the office friend group, contact, schedule, and presence related to work may be determined as group profile attribute information. For a friend group having relatively easy exchange such as the neighborhood friend group, SNS, schedule, and shared file may be determined as group profile attribute information.

The profile management module 410 may generate a group profile including determined group profile attribute information. According to an embodiment, the profile group management module 410 may configure a user interference corresponding to the generated group profile. According to an embodiment, the user interference for the group profile may be second data for at least a part of at least one user interface corresponding to a set of first information.

The group profile sharing module 420 may transmit the generated group profile to a request device or receive the generated group profile from a device having generated the group profile.

The group profile display module 430 may display a user interface corresponding to the generated or shared group profile. For example, the group profile display module 430 may display a user interface for a group profile in which information representing a group (for example, group name, relation information between group members, representative image, schedule, and anniversary) among group profile attribute information is re-processed to be text, images, and icons according to a display condition of the electronic device that displays the group profile.

Although the modules of FIG. 4 are illustrated as modules separated from the elements described in FIGS. 1 to 2, the group relation information acquisition module 400, the profile control module 410, the group profile sharing module 420, and the group profile display module 430 may be included in the memory 130 and perform operations by a control of the processor 120.

According to an embodiment, at least a part of the group relation information acquisition module 400 may be included and implemented within the communication interface 170 or at least other one module, and all functions of the group relation information acquisition module 400 may be included and implemented within the illustrated communication interface 170 or another module. According to an embodiment, at least a part of the profile management module 410 may be included and implemented within the processor 120 or at least one other module, and all functions of the profile management module 410 may be included and implemented within the illustrated processor 120 or another processor. According to an embodiment, at least a part of the group profile sharing module 420 may be included and implemented within the communication interface 170 or at least one other module, and all functions of the group relation information acquisition module 400 may be included and implemented within the illustrated communication interface 170 or another module. According to an embodiment, at least a part of the group profile display module 430 may be included and implemented within the display 160 or at least one other module, and all functions of the group profile display module 430 may be included and implemented within the illustrated display 160 or another processor.

All the above described modules may be included within the electronic device but may be included in each electronic device while being separated according to a role of two or more electronic devices. For example, a first electronic device that generates a group profile may include the group relation information acquisition module, the profile management module, and the group profile sharing module, and a second electronic device that displays a group profile may include the group profile display module. When the server manages personal or group profiles of the electronic devices, the server may include the group relation information acquisition module, the profile management module, and the group profile sharing module. The above described modules are not limited thereto and may be variously included in one or more electronic devices or the server.

Figure 5:
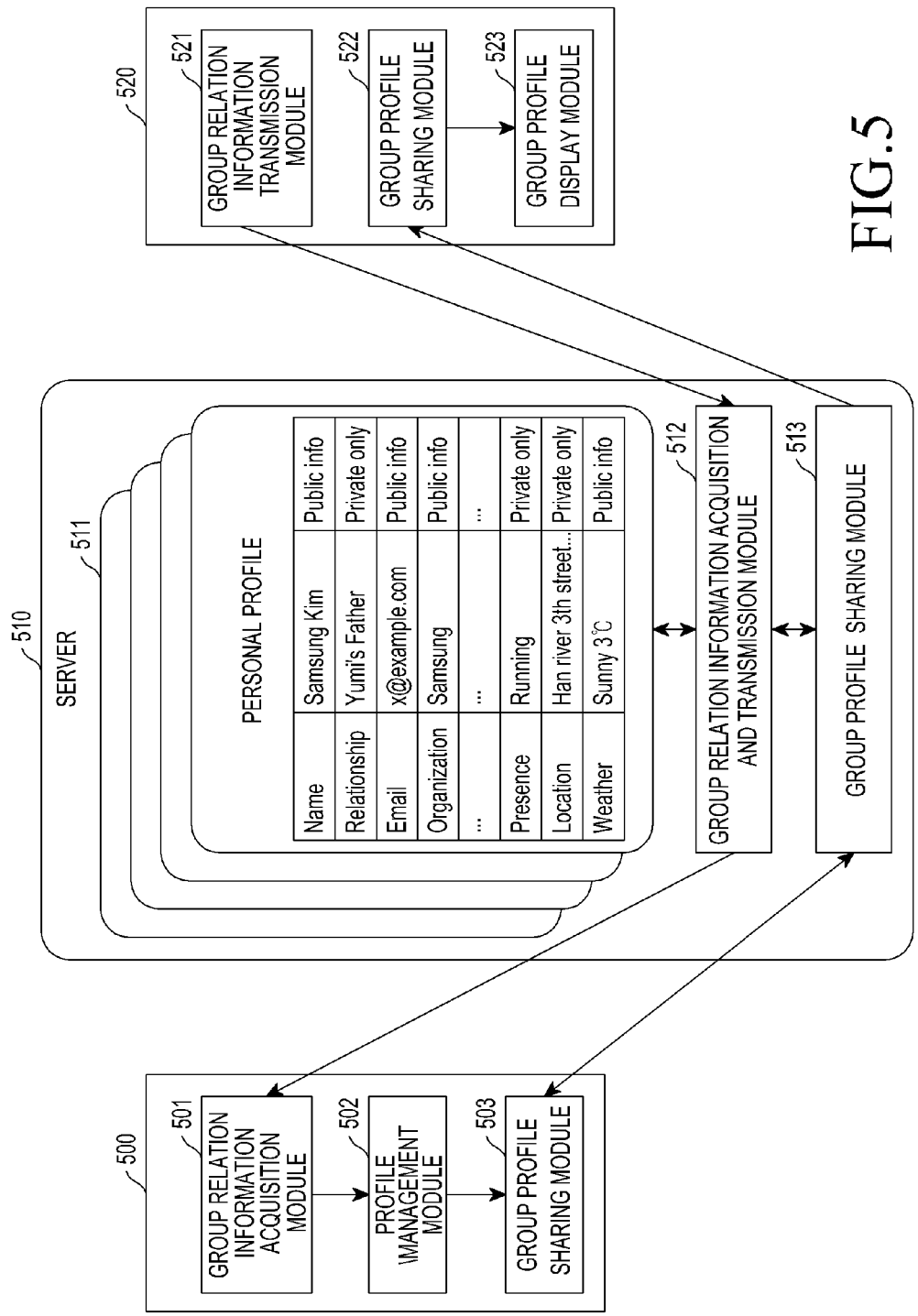
FIG. 5 illustrates a block diagram of a first system that generates and provides a group profile according to various embodiments.

FIG. 5 illustrates a block diagram of a first system that generates and provides a group profile according to various embodiments.

The first system according to the present disclosure may include a first electronic device 500 that generates a group profile, a server 510 that stores a personal profile of group members, group information, and state information, and a second electronic device 520 that receives a group profile. According to an embodiment, a user of the first electronic device 500 and a user of the second electronic device 520 may configure a group.

The first electronic device 500 may include a group relation information acquisition module 501, a profile management module 502, and a group profile sharing module 503.

The group relation information acquisition module 501 may acquire group relation information of group members according to a group profile generation request.

According to an embodiment, the group relation information acquisition module 501 may make a request for personal profiles of group members and group information to the server 510 that stores personal profiles of a plurality of users and group information, and receive the personal profile of the group members and the group information from the server 510.

The group profile management module 502 may generate a group profile based on group relation information in response to the request for generating the group profile. When the group does not exist, the group profile management module 502 may generate the group and then generate the group profile based on group relation information of members of the generated group. For example, the group profile management module 502 may determine group profile attribute information for the generation of the group profile by analyzing group relation information of members and generate the group profile including the determined group profile attribute information.

The group profile sharing module 503 may transfer the generated group profile to the server 510.

The server 510 may include a database 511, a group relation information acquisition and transmission module 512, and a group profile sharing module 513.

According to an embodiment, the server 510 may acquire and manage group relation information of group members, and transmit the group relation information to the first electronic device 500 according to a request. According to various embodiments, the server 510 may store and manage the group profile received from the first electronic device 500 and transmit the group profile to the second electronic device 520.

The database 511 may store group relation information including personal profiles of group members, group information, and state information. For example, the personal profiles stored in the database 511 may be configured as shown in Table 1 above.

The personal profiles may include additional information on whether the information is public or private. For example, each piece of information within personal profiles of group members or pieces of information on all groups may be set to be selectively public or private.

When there is a request for group relation information of group members from the first electronic device 510, the group relation information acquisition and transmission module 512 may transmit the requested group relation information of the group members to the first electronic device 500.

When receiving the group profile from the first electronic device 510, the group profile sharing module 513 may transmit the received group profile to the second electronic device 520.

The second electronic device 520 may include a group relation information transmission module 521, a group profile sharing module 522, and a group profile display module 523.

The group relation information transmission module 521 may transmit group relation information to the server 510 according to a request or periodically, or, when the group relation information is updated such as addition, deletion, or change, transmit the updated group relation information to the server 510. The group relation information transmission module 521 may be included in the communication interface 170.

The group profile sharing module 522 may receive the group profile from the server 510.

The group profile display module 523 may display the received group profile.

Figure 6:
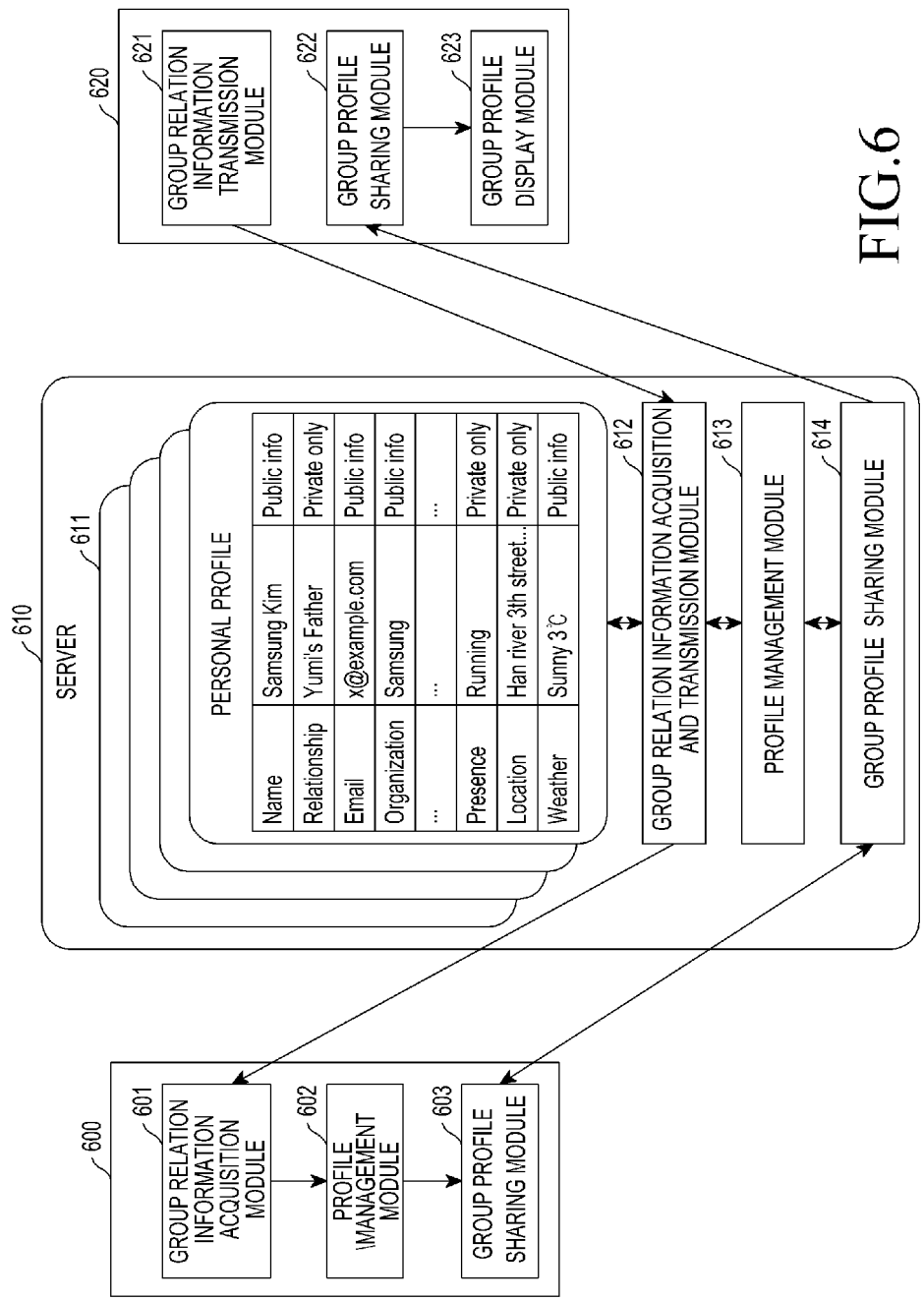
FIG. 6 illustrates a block diagram and an operation of a second system that generates and provides a group profile according to various embodiments.

FIG. 6 illustrates a block diagram and an operation of a second system that generates and provides a group profile according to various embodiments.

The second system according to the present disclosure may include a first electronic device 600 that generates a group profile, a server 610 that manages a group profile, and a second electronic device 620 that receives a group profile. According to an embodiment, a user of the first electronic device 600 and a user of the second electronic device 620 may configure a group.

According to FIG. 6, the first electronic device 600 may include a group relation information acquisition module 601, a profile management module 602, and a group profile sharing module 603.

The server 610 may include a database 611, a group relation information acquisition and transmission module 612, a profile management module 613, and a group profile sharing module 614 and, when receiving updated group relation information from the second electronic device 620, update the group profile based on the updated group relation information.

The group relation information acquisition and transmission module 612 may receive the updated group relation information from the second electronic device 620. The profile management module 613 may store the received updated group relation information of the second electronic device 620 in the database 611 and update a group profile related to the second electronic device 620 based on the updated group relation information. The group profile sharing module 614 may transmit the updated group profile to the first electronic device 600 and the second electronic device 620.

The second electronic device 620 may include a group relation information transmission module 621, a group profile sharing module 622, and a group profile display module 623.

Figure 7:
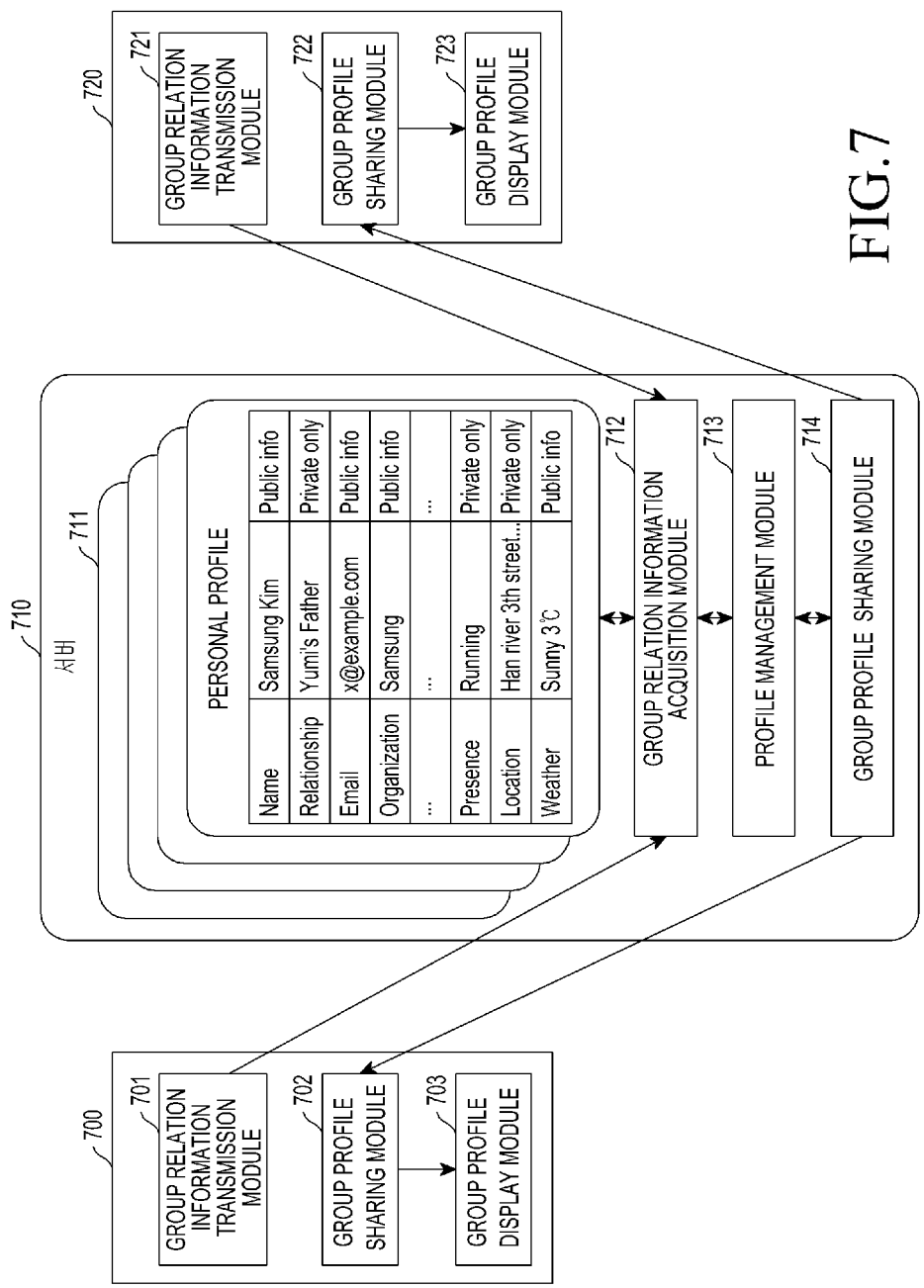
FIG. 7 illustrates a block diagram and an operation of a third system that generates and provides a group profile according to various embodiments.

FIG. 7 illustrates a block diagram and an operation of a third system that generates and provides a group profile according to various embodiments.

The third system according to the present disclosure may include a first electronic device 700 and a second electronic device 720 that provide group relation information such as a personal profile and receives a group profile, and a server 710 that generates and manages a group profile.

According to FIG. 7, the first electronic device 700 may include a group relation information transmission module 701, a group profile sharing module 702, and a group profile display module 703, and transmit group relation information to the server 710. When the group relation information is updated, the group relation information transmission module 701 may transmit the updated group relation information to the server 710.

The server 710 may include a database 711, a group relation information acquisition module 712, a profile management module 713, and a group profile sharing module 714.

The database 711 may store group relation information of a plurality of users including a user of the first electronic device 700 and a user of the second electronic device 720. The database 711 may store the updated group relation information.

The group relation information acquisition module 712 may receive group relation information from the first electronic device 700 and the second electronic device 720. According to an embodiment, the group relation information acquisition module 712 may receive the updated group relation information from the first electronic device 700 or the second electronic device 720.

The profile management module 713 may generate a group based on the group relation information received from the first electronic device 700 and the second electronic device 720 and generate a group profile of the generated group. When receiving the updated group relation information from the first electronic device 700 or the second electronic device 720, the profile management module 713 may update the group profile based on the updated group relation information.

The group profile sharing module 714 may transmit the generated group profile to the first electronic device 700 and the second electronic device 720. According to an embodiment, the group profile sharing module 714 may transmit the updated group profile to the first electronic device 700 and the second electronic device 720.

The second electronic device 720 may include a group relation information transmission module 721, a group profile sharing module 722, and a group profile display module 723.

The modules as described above according to an embodiment of the present disclosure may be included in the memory 130 and may perform operations by a control of the processor 120.

The modules described above according to an embodiment of the present disclosure maybe implemented in separated systems or in one system.

According to various embodiments of the present disclosure, an electronic device may include: a communication module; a processor electrically connected to the communication module; and a memory electrically connected to the processor, wherein the memory is configured to store instructions, that when executed, instruct the processor to: receive, from a first external device, a request for generating a set of first information related to a group including a plurality of users using different electronic devices through the communication module, receive, from the first external device or a second external device, a set of second information related to at least some of the plurality of users, generate first data, including the set of first information, and second data for at least a part of at least one user interface corresponding to the set of first information based on at least some of the received set of second information, and transmit the first data or the second data to the first external device through the communication module.

According to various embodiments of the present disclosure, an electronic device may include: at least one communication module; a display; a processor electrically connected to the at least one communication module and the display; and a memory electrically connected to the processor, wherein the memory is configured to store instructions, that when executed, instruct the processor to: transmit a request for generating a group profile of a plurality of users who use different electronic devices to an external device through the at least one communication module, transmit personal profiles of at least some of the plurality of users to the external device through the at least one communication module, receive data related to at least one user interface corresponding to the group profile of the plurality of users generated at least based on some of the transmitted personal profiles from the external device through the communication module, and display a user interface based on at least some of the received data on the display.

According to various embodiments of the present disclosure, an electronic device may include: a communication module; a processor electrically connected to the communication module; and a memory electrically connected to the processor, wherein the memory is configured to store instructions, that when executed, instruct the processor to: receive a request, for personal profiles of at least some of a plurality of users that use different electronic devices, from a first external device through the communication module, retrieve a personal profile, stored in the memory, from among at least some personal profiles, transmit the personal profile to the first external device or a second external device, and receive data, corresponding to a group profile of the plurality of users and generated based on the transmitted personal profile, from the first external device or the second external device.

Figure 8:
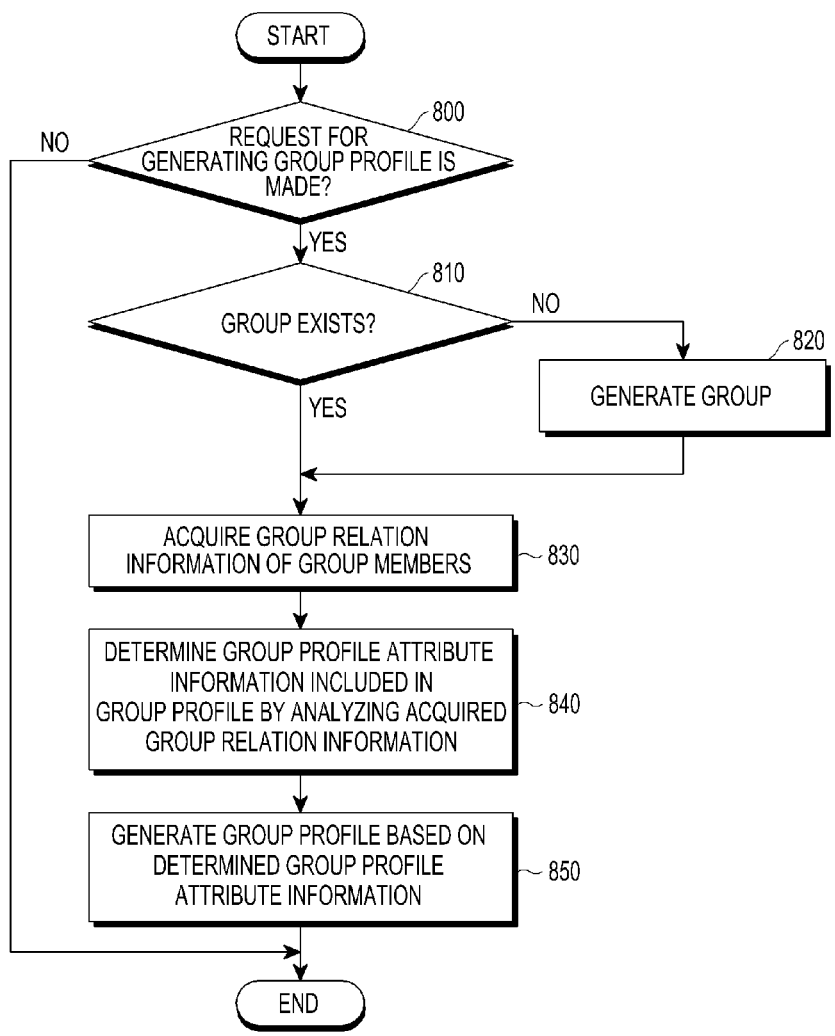
FIG. 8 illustrates a process for generating a group profile by a processor according to various embodiments.

FIG. 8 illustrates a process for generating a group profile by a processor according to various embodiments.

According to FIG. 8, the processor 120 determines whether there is a request for generating a group profile in operation 800. The processor 120 performs operation 810 when there is the request for generating the group profile, and terminates the operation for generating the group profile when there is no request for generating the group profile.

The processor 120 may determine whether a group for generating the group profile exists in operation 810. The processor 120 may perform operation 830 when the group exists and generate the group in operation 820 when the group does not exist.

In operation 830, the processor 120 may acquire group relation information of group members. For example, the processor 120 may receive the group relation information from server that stores the group relation information of the group members or the electronic device of the group members. The processor 120 may acquire group relation information corresponding to group members among a plurality of pieces of pre-stored group relation information.

In operation 840, the processor 120 may determine group profile attribute information included in the group profile by analyzing the acquired group relation information. For example, the processor 120 may assign a weighted value to each piece of group relation information and determine group relation information having a highest weighted value as the group profile attribute information.

In operation 850, the processor 120 may generate a group profile including the determined group profile attribute information.

Figure 9:
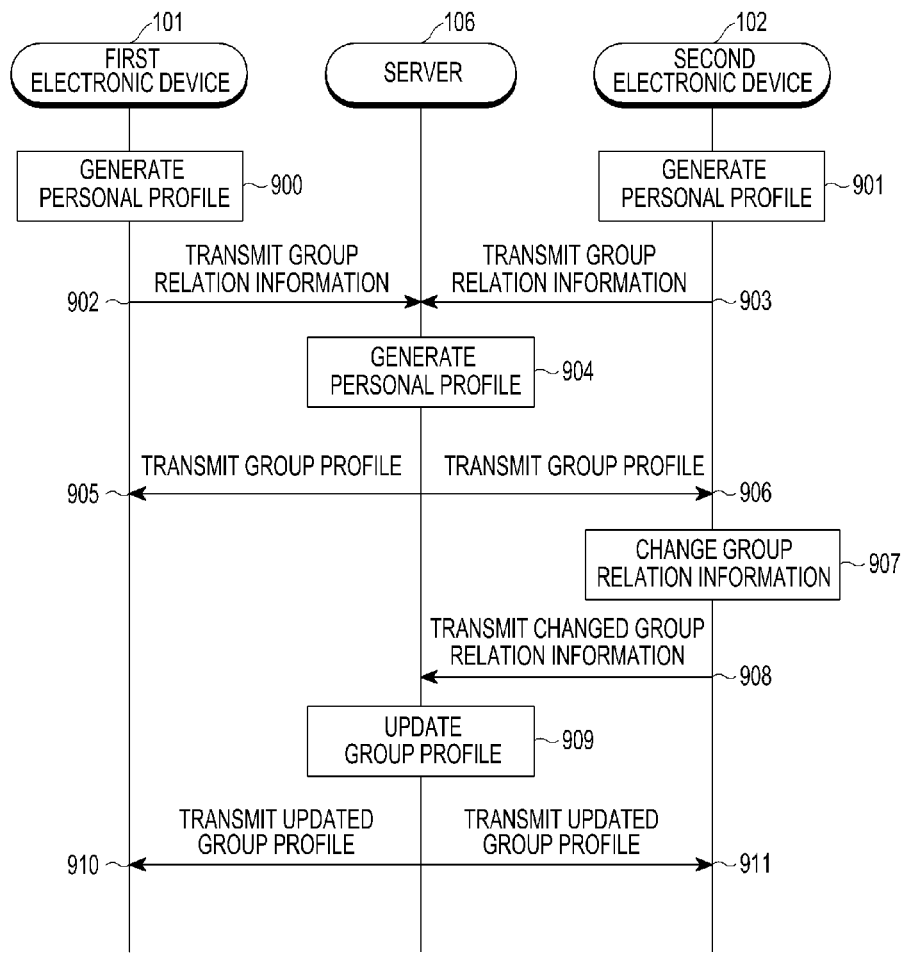
FIG. 9 illustrates a process of a system for generating a group profile based on group relation information received from a first electronic device and a second electronic device by a server according to various embodiments.

FIG. 9 illustrates a process of a system for generating, by the server, a group profile based on group relation information received from the first electronic device and the second electronic device according to various embodiments.

According to FIG. 9, the first electronic device 101 and the second electronic device 102 may be set as a group, and the server 106 may acquire group relation information from the first electronic device 101 and the second electronic device 102 and generate a group profile.

The first electronic device 101 may generate a personal profile in operation 900, and the second electronic device 102 may generate a personal profile in operation 901. Operations 900 and 901 may be performed simultaneously or not.

The first electronic device 101 may transmit group relation information of the first electronic device 101 to the server 106 in operation 902, and the second electronic device 102 may transmit group relation information of the second electronic device 102 to the server 106. Operations 902 and 903 may be performed simultaneously or not.

In operation 904, the server 106 may generate a group profile based on the acquired group relation information.

The server 106 may transmit the generated group profile to the first electronic device 101 in operation 905, and transmit the generated group profile to the second electronic device 102 in operation 906. Operations 905 and 906 may be performed simultaneously or not.

When the group relation information of the second electronic device 102 changes in operation 907, the second electronic device 102 may transmit the changed group relation information to the server 106 in operation 908.

In operation 909, the server 106 may update the group profile based on the changed group relation information.

The server 106 may transmit the updated group profile to the first electronic device 101 in operation 910, and transmit the updated group profile to the second electronic device 102 in operation 911. Operations 910 and 911 may be performed simultaneously or not.

Figure 10:
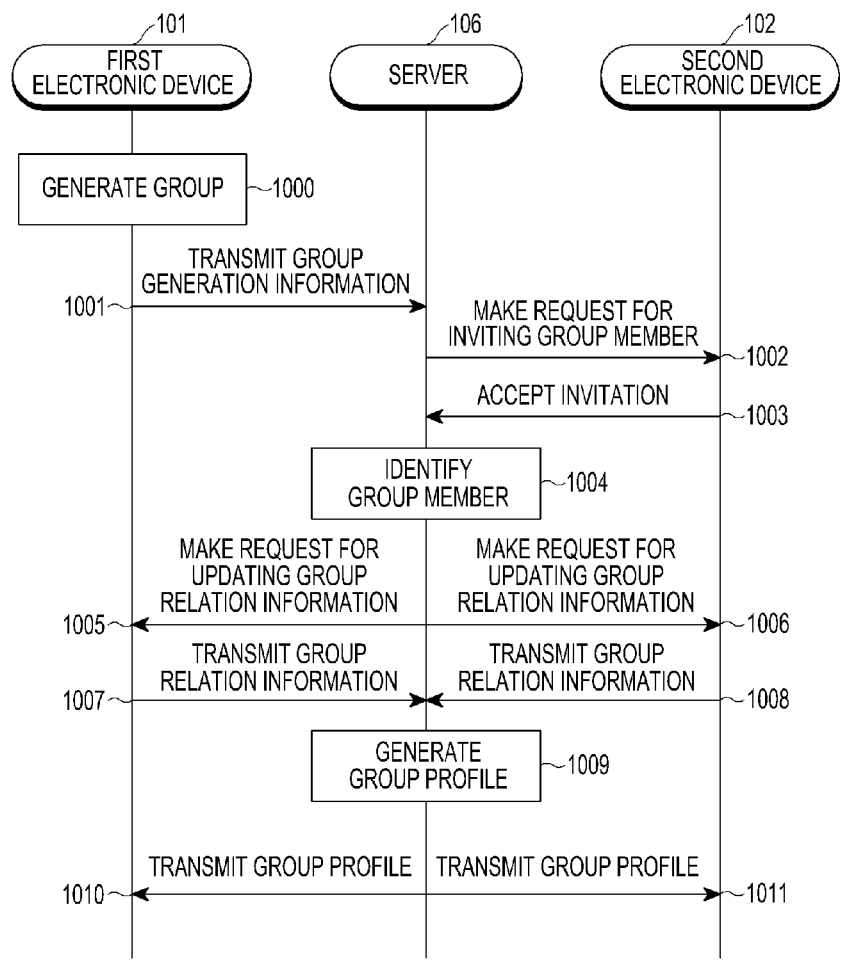
FIG. 10 illustrates a process of a system for generating a group profile by a server when a first electronic device generates a group and invites a second electronic device as a group member according to various embodiments.

FIG. 10 illustrates a process of a system for generating a group profile by the server when the first electronic device generates a group and invites the second electronic device as a group member.

According to FIG. 10, the first electronic device 101 may set a group including the second electronic device 102, and the server 106 may acquire group relation information from the first electronic device 101 and the second electronic device 102 and generate a group profile.

In operation 1000, the first electronic device 101 may generate the group including the second electronic device 102.

In operation 1001, the first electronic device 101 may transmit group generation information of the generated group to the server 106.

In operation 1002, the server 106 may transmit an invitation request for inviting the second electronic device 102 as the group member to the second electronic device 102 based on the group generation information.

When receiving an invitation approval from the second electronic device 102 in response to the invitation request in operation 1003, the server 106 may transmit an update request for group relation information of the first electronic device 101 to the first electronic device 101 in operation 1005 and transmit an update request for group relation information of the second electronic device 102 to the second electronic device 102 in operation 1006. Operations 1005 and 1006 may be performed simultaneously or not.

When receiving the group relation information of the first electronic device 101 from the first electronic device 101 in operation 1007 and receiving the group relation information of the second electronic device 102 from the second electronic device 102 in operation 1008, the server 106 may generate the group profile based on the acquired group relation information in operation 1009. Operations 1007 and 1008 may be performed simultaneously or not.

The server 106 may transmit the generated group profile to the first electronic device 101 in operation 1010, and transmit the generated group profile to the second electronic device 102 in operation 1011. Operations 1010 and 1011 may be performed simultaneously or not.

According to various embodiments of the present disclosure, a method of providing a group profile may include: an operation of receiving a request for generating a set of first information related to a group including a plurality of users who use different electronic devices from a first external device; an operation of receiving a set of second information related to at least some of the plurality of users from the first external device or a second external device; an operation of generating first data including the set of first information or second data for at least some of at least one user interface corresponding to the set of first information based on at least some of the received set of second information; and an operation of transmitting the first data or the second data to the first external device.

According to various embodiments of the present disclosure, a method of providing a group profile may include: an operation of transmitting a request for generating a group profile of a plurality of users who use different electronic devices to an external device; an operation of transmitting personal profiles of at least some of the plurality of users to the external device; an operation of receiving data related to at least one user interface corresponding to the group profile of the plurality of users generated based on at least some of the transmitted personal profiles from the external device; and an operation of displaying the user interface based on at least some of the received data on the display.

According to various embodiments of the present disclosure, a method of providing a group profile may include: an operation of receiving a request for personal profiles of at least some of a plurality of users who use different electronic devices from a first external device; an operation of retrieving a personal profile, stored in a memory, from among at least some of the personal profiles; an operation of transmitting the personal profile to the first external device or a second external device; and an operation of receiving data, corresponding to a group profile of the plurality of users and generated based on the transmitted personal profile, from the first external device or the second external device.

Figure 12:
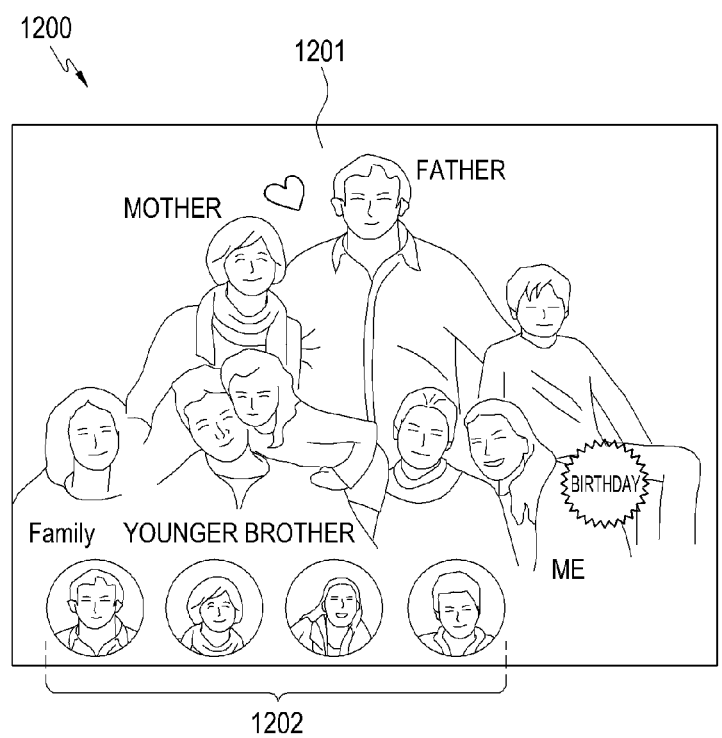

FIGS. 11 to 12 illustrate examples for generating group profiles of a family group according to various embodiments.

According to an embodiment, a third user may be a subject for generating a group profile and an electronic device of the third user may be a group profile generation device.

When there is a profile generation request, the processor 120 may acquire group relation information of a first user, a second user, and a fourth user from electronic devices of the first user, the second user, and the fourth user corresponding to family group members. For example, the electronic device of the third user may make a request for group relation information to the electronic devices of the first user, the second user, and the fourth user, and receive the group relation information of the first user, the second user, and the fourth user from the electronic devices of the first user, the second user, and the fourth user.

The acquired group relation information of the group members may be configured as shown in FIG. 11.

According to FIG. 11, the group relation information may include various pieces of information such as a group name, a category, and an owner as well as the information shown in FIG. 11, but is not limited thereto.

According to an embodiment, the processor 120 may check a relationship of the group relation information, a group name, and a category and identify that the corresponding group is a family group. For example, the processor 120 may check relationship information between the first user, the second user, and the fourth user (for example, Yumi's father, Yumi's mother, Yumi (me), and Yumi's younger brother) based on the third user having made the request for generating the group profile and identify that the corresponding group is the family group. Further, the processor 120 may check common information (for example, address) of group members and identify that the corresponding group is the family group. Based on such an identification result, the processor 120 may designate or recommend a group name as "family".

The processor 120 may determine group profile attribute information included in a family group profile by analyzing the acquired group relation information. For example, the processor 120 may assign a weighted value to each piece of group relation information according to a predetermined condition and determine at least one piece of group relation information to which a high weighted value is assigned as the group profile attribute information.

The group relation information with the weighted values assigned to the family group may be configured as shown in Table 5 below.

TABLE 5

| Group relation information | Family |
|---|---|
| Email | 5 |
| Contact | 6 |
| SNS | 5 |
| Anniversary/Birthday | 10 |
| Schedule | 6 |
| Frequently used means for contact | 10 |
| Shared file | 10 |
| Account information | 10 |
| Current location | 10 |
| Presence | 10 |
| Weather | 9 |

According to Table 5 above, at least one piece of group relation information to which a high weighted value is assigned may include "an anniversary/birthday, a frequently used means for contact, a shared file, account information, a current location, and presence", and such information may be determined as group profile attribute information.

The processor 120 may generate a group profile including the determined group profile attribute information and generate a user interface corresponding to the generated group profile. The generated user interface may be configured as shown in FIG. 12.

According to FIG. 12, the processor 120 may configure a user interface 1200 including a group name such as "Family", relationship information including "father, mother, younger brother, and me", a representative image including family group members (for example, a recently taken photo, a frequently checked photo, and a frequently shared photo), function icons for performing various functions related to group members, and birthday information of a family member having a birthday.

According to an embodiment, the processor 120 may set a photo frequently shared by family group members as a representative image 1201 to configure the user interface 1200. Further, the processor 120 may detect a photo including family group members among photos shared by the family group members by performing a face recognition based on profile photos included in personal profiles of the family group members and set the detected photo as the representative image 1201.

According to an embodiment, the processor 120 may detect people corresponding to respective family group members in the representative image by performing the face recognition based on the profile photos of the family group members and configure the user interface 1200 to display relationship information (for example, father, mother, younger brother, and me) of the family members at locations close to the detected people.

According to an embodiment, the processor 120 may configure the user interface 1200 to display function icons 1202 to perform various functions such as a function for displaying a personal profile of the family group member and a function for making a call connection with the family group member.

Figure 14:
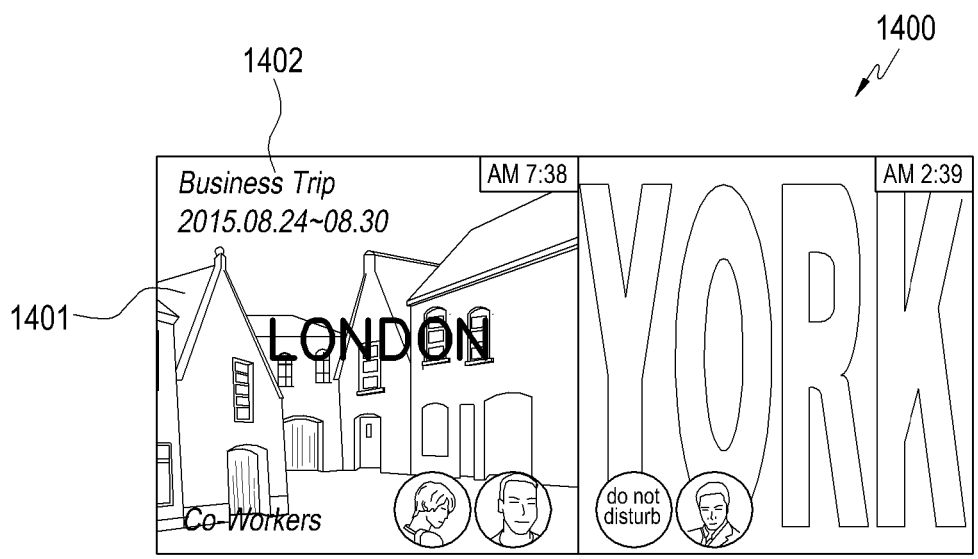

FIGS. 13 to 14 illustrate examples for generating a group including different users associated with the user based on state information of the user and generating a group profile of the generated group according to various embodiments.

According to FIG. 13, the processor 120 may recommend or generate a group including users associated with a third user based on state information of the third user. According to various embodiments, the processor 120 may recommend or generate a group including users associated with the third user based on basic information or extended information as well as the state information of the third user.

According to an embodiment, the processor 120 may determine users associated with the third user based on presence information of the third user and recommend or generate a group including the determined users. Here, the processor 120 may determine a user having information that matches at least one piece of the basic information, the extended information, and the state information of the third user as the user associated with the third user.

For example, the processor 120 may determine, as users associated with the third user, a first user, second user, and fourth user having the same presence information (on a business trip) as that of the third user among the users having the same affiliation information of the third user, and recommend or generate a group including the first user, the second user, the third user, and the fourth user.

The processor 120 may check relation information with the first user, the second user, and the fourth user based on the third user (for example, senior, superior, or me) or common information of group members (for example, email address or affiliation) and identify the group to be recommended or generated as an office group. The processor 120 may designate or recommend a group name as "office (co-workers)" based on a result of the identification.

The processor 120 may make a request for group relation information to electronic devices of the first user, the second user, and the fourth user and receive the group relation information of the first user, the second user, and the fourth user from the electronic devices of the first user, the second user, and the fourth user.

The processor 120 may determine group profile attribute information included in the office group profile by analyzing the received group relation information. For example, the group profile generation device may assign a weighted value to each piece of group relation information according to a predetermined condition and determine at least one piece of group relation information to which a high weighted value is assigned as the group profile attribute information.

The group relation information with the weighted values assigned to the office group may be configured as shown in Table 6 below.

TABLE 6

| Group relation information | office |
|---|---|
| Email | 10 |
| Contact | 10 |
| SNS | 4 |
| Anniversary/Birthday | 7 |
| Schedule | 10 |
| Frequently used means for contact | 8 |
| Shared file | 10 |
| Account information | 5 |
| Current location | 5 |
| Presence | 10 |
| Weather | 5 |

According to Table 6 above, at least one piece of group relation information to which a high weighted value is assigned may include "email, contact, schedule, shared file, and presence" and such information may be determined as group profile attribute information.

According to an embodiment, the processor 120 may determine group profile attribute information to be included in the group profile according to the received group relation information or a security setting level such as public/private.

The security setting level information such as public/private may be determined based on settings or personal information security settings of members.

In other words, the processor 120 may determine the group profile attribute information in consideration of various security levels. For example, the processor 120 may determine account information of the group relation information as the group profile attribute information in order to generate the group profile of members having a highest security level.

According to an embodiment, the processor 120 may generate one or more group profiles according to the security level of the user. In other words, the processor 120 may generate a group profile having the highest security level or generate a group profile of members having a particular security level.

According to an embodiment, the processor 120 may determine group profile attribute information based on state information of group members (for example, vacation or schedule). For example, when all the group members are on vacation, the processor 120 may exclude contact information of the group relation information from the group profile attribute information.

The processor 120 may generate a group profile including the determined group profile attribute information and generate a user interface corresponding to the generated group profile. The generated user interface may be configured as shown in FIG. 14.

According to FIG. 14, the processor 120 may configure a user interface 1400 including a group name such as an office (co-worker)", an image related to office group members (for example, image representing a location of the office group member), a business trip schedule of the office group members, profile images of the office group members, an image related to a business trip destination, and a time of a place of the business trip.

According to an embodiment, the processor 120 may set the image related to the office as a representative image 1401 in order to configure the user interface 1400 of the office group members. For example, when the office is located in London, the processor 120 may set an image related to London as the representative image 1401.

According to an embodiment, the processor 120 may configure the user interface 1400 to display schedule information 1402 of office group members on the representative image 1401.

According to an embodiment, the processor 120 may configure the user interface 1400 to distinguish an office group member working in the office, an office group member on a business trip in New York, and an office group member whose information is private based on schedule information and presence information of the office group members. For example, the processor 120 may configure the user interface 1400 to place a profile photo of the office group member working in the office on an image related to London and place a profile photo of the office group member on the business trip in New York on an image related to New York among the office group members.

According to an embodiment, the processor 120 may differently set the type of determined group profile attribute information, a layout of the user interface configuring the group profile according to group attributes, and an effect applied to the user interface.

According to an embodiment, when there are a plurality of group profiles for a particular group, the processor 120 may select a group profile to be displayed by a user's selection or a determination by the group profile generation device and generate a user interface for the selected group profile.

According to an embodiment, the processor 120 may variously configure the user interface for the group profile according to a user's designation or various conditions. For example, the processor 120 may configure the user interface based on a photo or contact.

According to an embodiment, the processor 120 may set security to the group profile and assign a right to every user to allow only the user who acquires the right to identify the group profile.

According to an embodiment, the processor 120 may configure different group profile user interfaces according to member levels such as a non-subscriber who does not join the group and subscribers (for example, guest/associate member/full member) who join the group and differently display group profile information which can be identified by the non-subscriber, group profile information which can be identified by the guest among the subscribers, and the group profile information which can be identified by the full member.

Figure 15A:
FIGS. 15A and 15B illustrate an example showing a user interface for a group profile according to various embodiments.
Figure 15B:
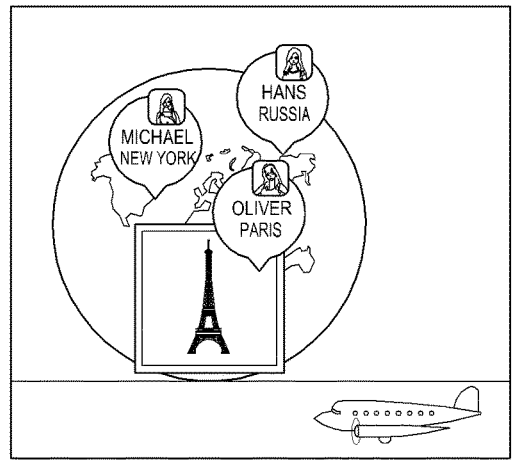

FIGS. 15A-15B illustrate examples showing user interfaces of group profiles according to various embodiments.

According to FIG. 15, the processor 120 may generate a user interface of a group profile in the form of various formats such as an image, a combination of an image and text, and a video based on the determined group profile attribute information.

According to an embodiment, when the group name is "Baby", the processor 120 may configure a user interface including a representative image corresponding to a combination of an English letter B and an image as illustrated in FIG. 15A.

According to an embodiment, when among office group members located in Paris "OLIVER" is located in Paris, "MICHAEL" is located in New York for a business trip, and "HANS" is located in Russia for a business trip, the processor 120 may configure a user interface to display "OLIVER" located in Paris, "MICHAEL" located in New York, and "HANS" located in Russia on a map image as illustrated in FIG. 15B.

FIGS. 16 to 22 illustrate examples showing user interfaces including detailed information of group profiles according to various embodiments.

According to FIG. 16, the processor 120 may configure a user interface to display not only basic information such as a group name like "Family", relationship information including "father, mother, younger brother, and me", a representative image including family group members (for example, a recently taken photo, a frequently checked photo, and a frequently shared photo), function icons for performing various functions related to group members, and birthday information of a family member having a birthday but also additional information such as a date on which the user joins the group, address information, profile photos of family members, shared photos, and account information.

Figure 17:
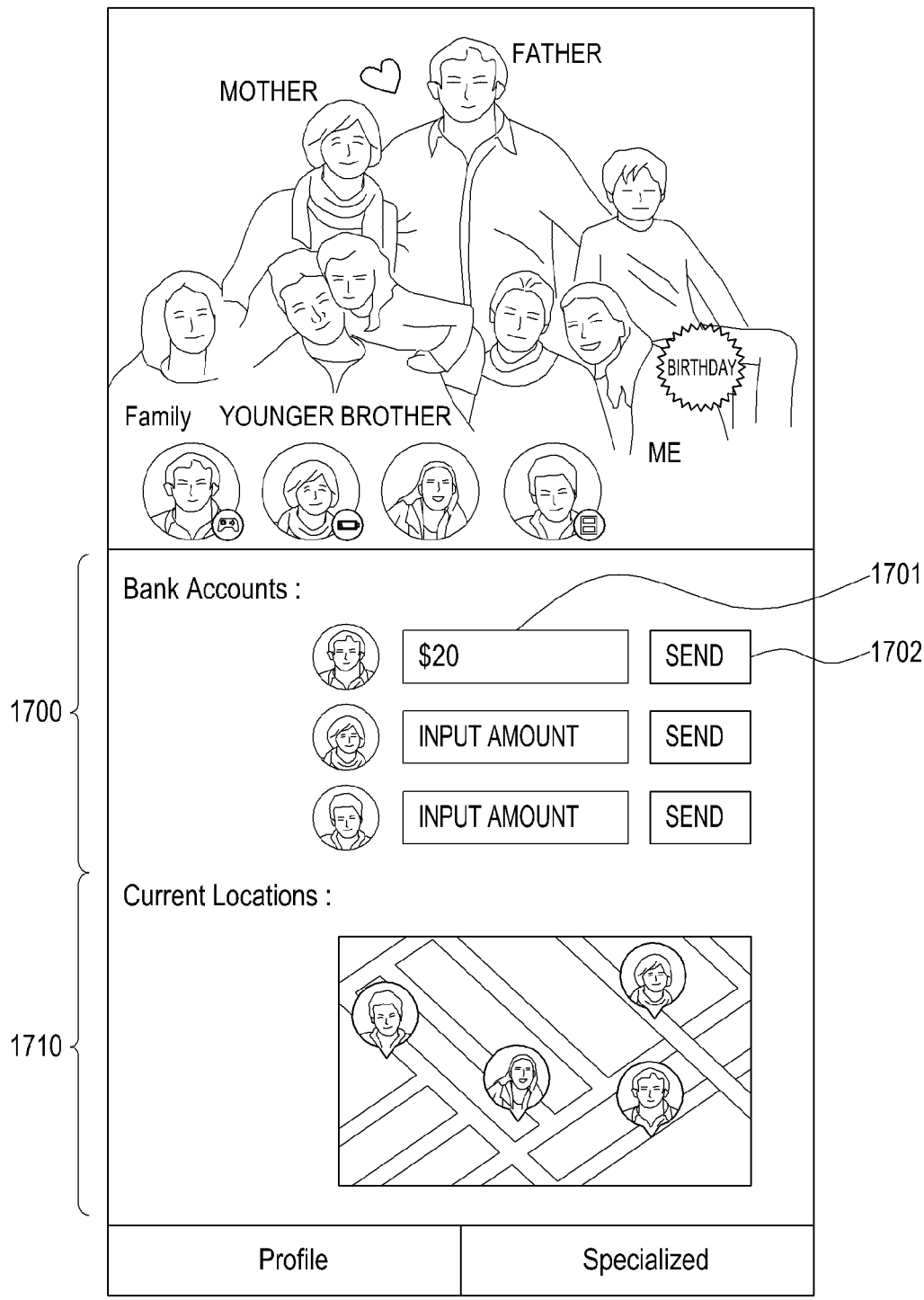

According to FIG. 17, the processor 120 may configure a user interface 1700 including a user interface for transferring money to an account of each group member based on account information shared between group members without a separate complex process. For example, the processor 120 may configure the user interface 1700 including an input area 1701 for inputting an amount to be transferred to the account of each family group member and a send button 1702 for transmitting an input amount to the account of the corresponding family group member.

According to an embodiment, the processor 120 may configure a user interface 1710 including a user interface for informing of current locations of the family group members. For example, the processor 120 may configure the user interface 1710 to display the location of each family group member on a map based on current location information of the family group members.

Figure 18:
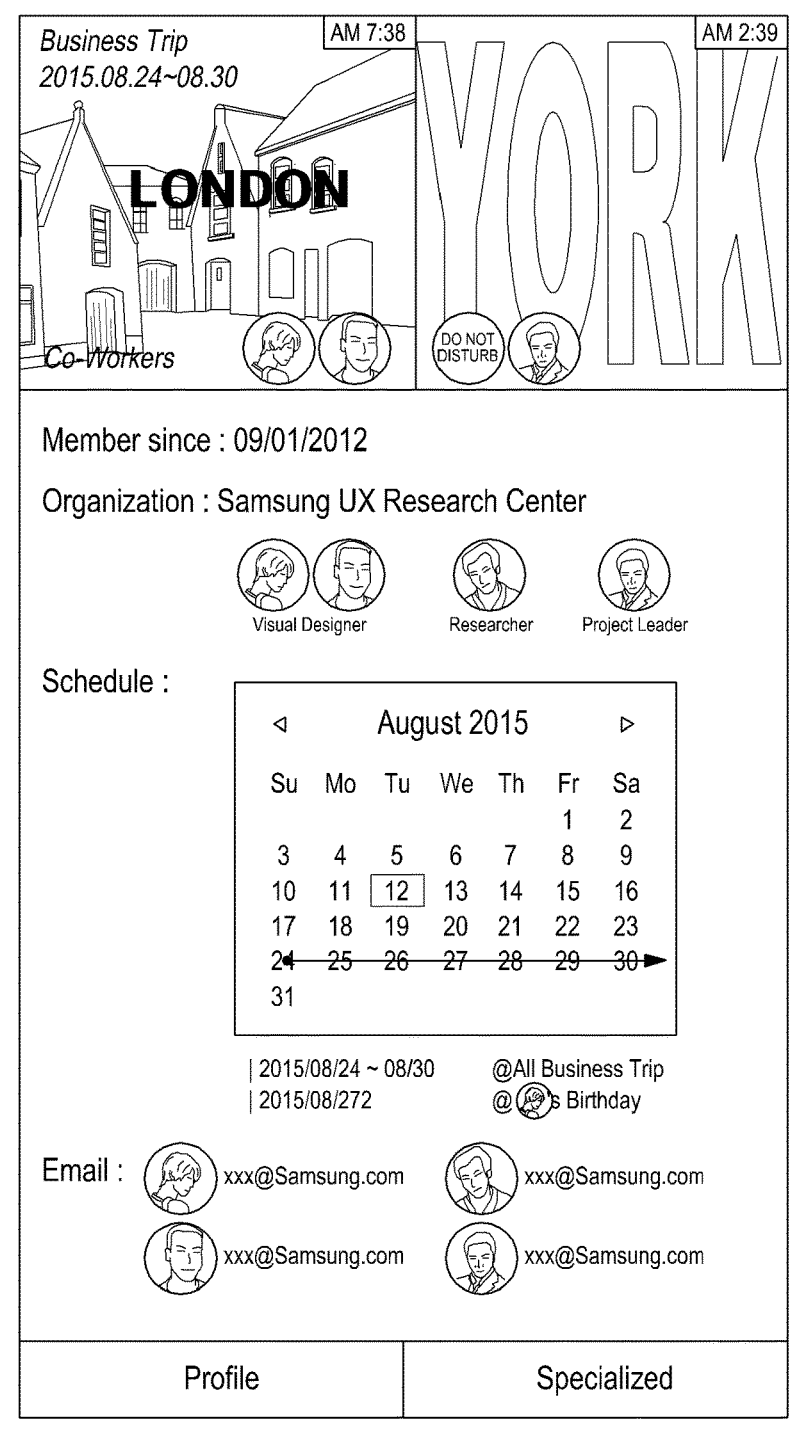

According to FIG. 18, the processor 120 may configure a user interface to display not only basic information such as a group name like "office (co-worker)" an image related to office group members (for example, an image indicating a location of the office group member), a business trip schedule of office group members, organization information including "a visual designer, a researcher, and a project manager" an image related to a business trip destination, and a time of the business trip destination but also additional information such as a date on which the user joins the group, relationship information of office group members, schedule information, and an email address.

Figure 19:
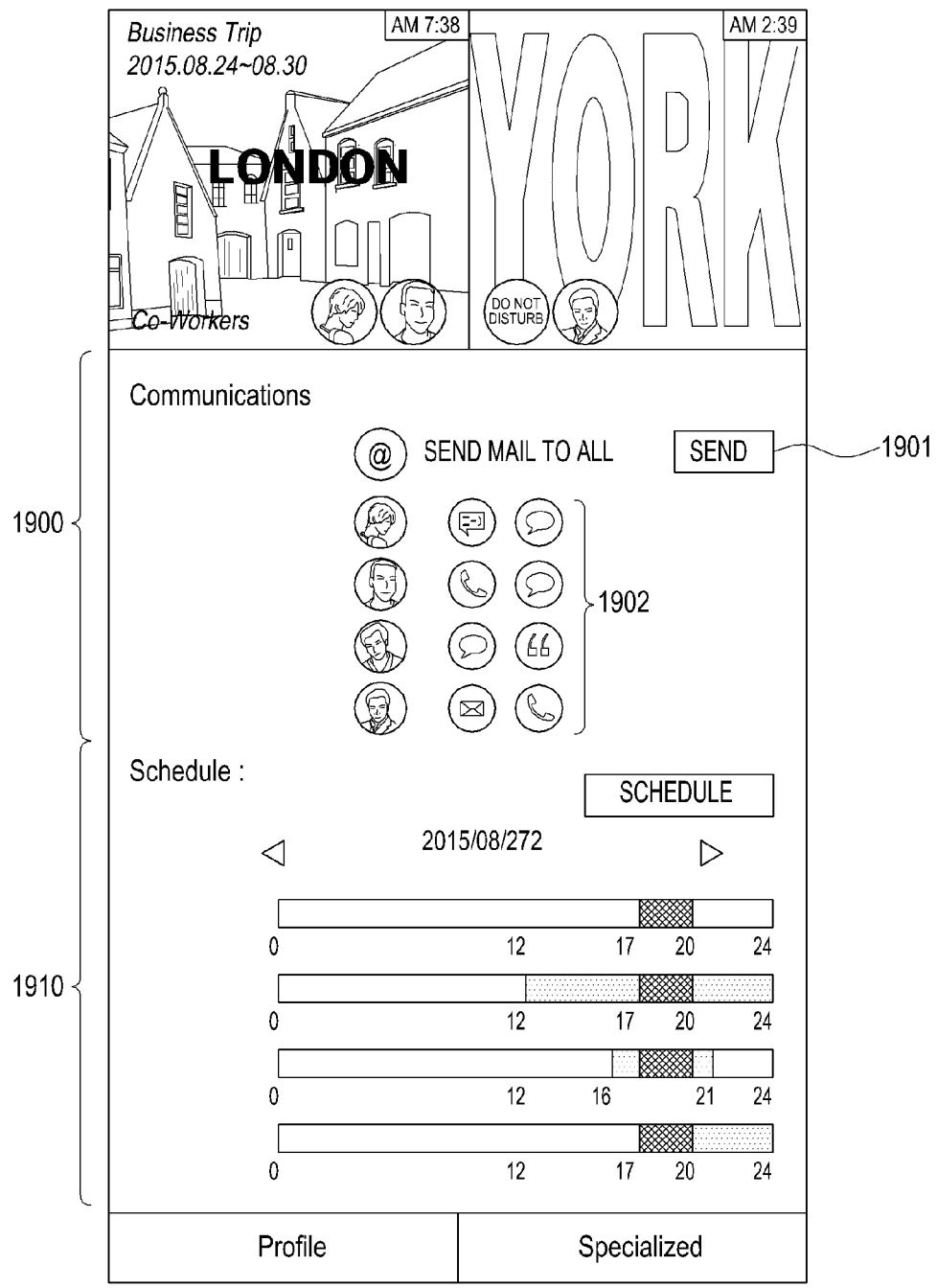

According to FIG. 19, the processor 120 may configure a user interface 1900 for contacting group members through means commonly used by the group members. For example, the processor 120 may configure a user interface 1900 including a send button 1901 for sending an email to an email address of each office group member. Further, the processor 120 may configure a user interface 1900 including contact means icons 1902 for contacting each group member through a frequently used contact means. For example, when a contact means frequently used by a first group member corresponds to a phone call and a contact means frequently used by a second group member corresponds to an instant message, the processor 120 may configure a user interface including a function of the phone call and a function for the instant message.

According to an embodiment, the processor 120 may configure a user interface 1910 for displaying a schedule of each office group member and adding, deleting, and change each schedule.

According to an embodiment, the processor 120 may configure a user interface for using a mobile pay service between group members and a user interface for sharing information such as a meeting or event between group members included in a particular space. Further, the processor 120 may configure a user interface for using a financial service such as Fintech between group members.

Figure 20:
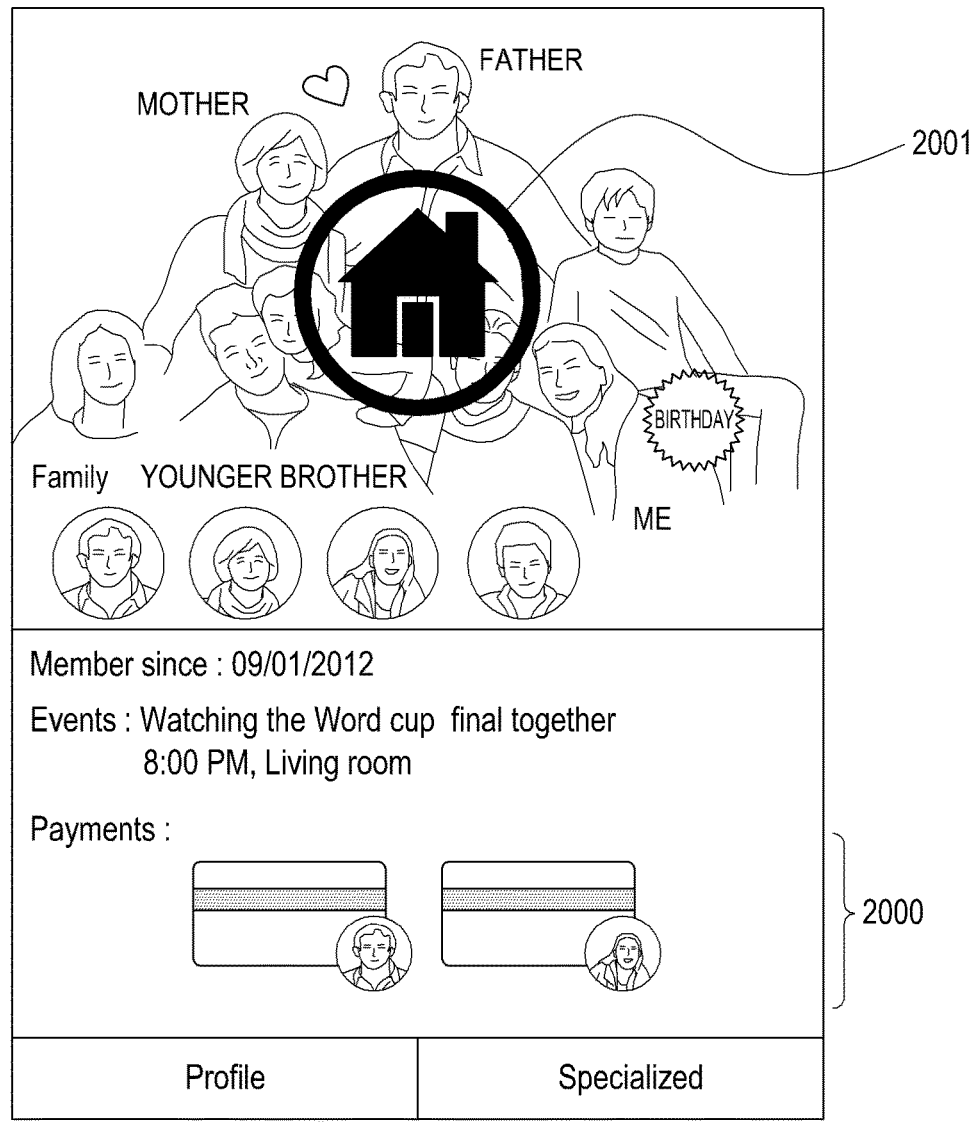

More specifically, according to FIG. 20, the processor 120 may configure a user interface for payment to share a payment function between particular group members.

For example, when a group profile includes credit card payment information of group members (for example, father and daughter) of a particular group (for example, family group), the processor 120 may configure a user interface 2000 to allow all or some of the group members who share the group profile to perform payment based on the credit card payment information as illustrated in FIG. 20.

Further, when pieces of location information of group members of the particular group are the same as a particular place, the processor 120 may configure a user interface to display an event related to the particular place.

For example, when pieces of location information of group members of the family group are the same as "home", the processor 120 may configure a user interface to display an image 2001 related to "home" on a representative image.

Figure 21:
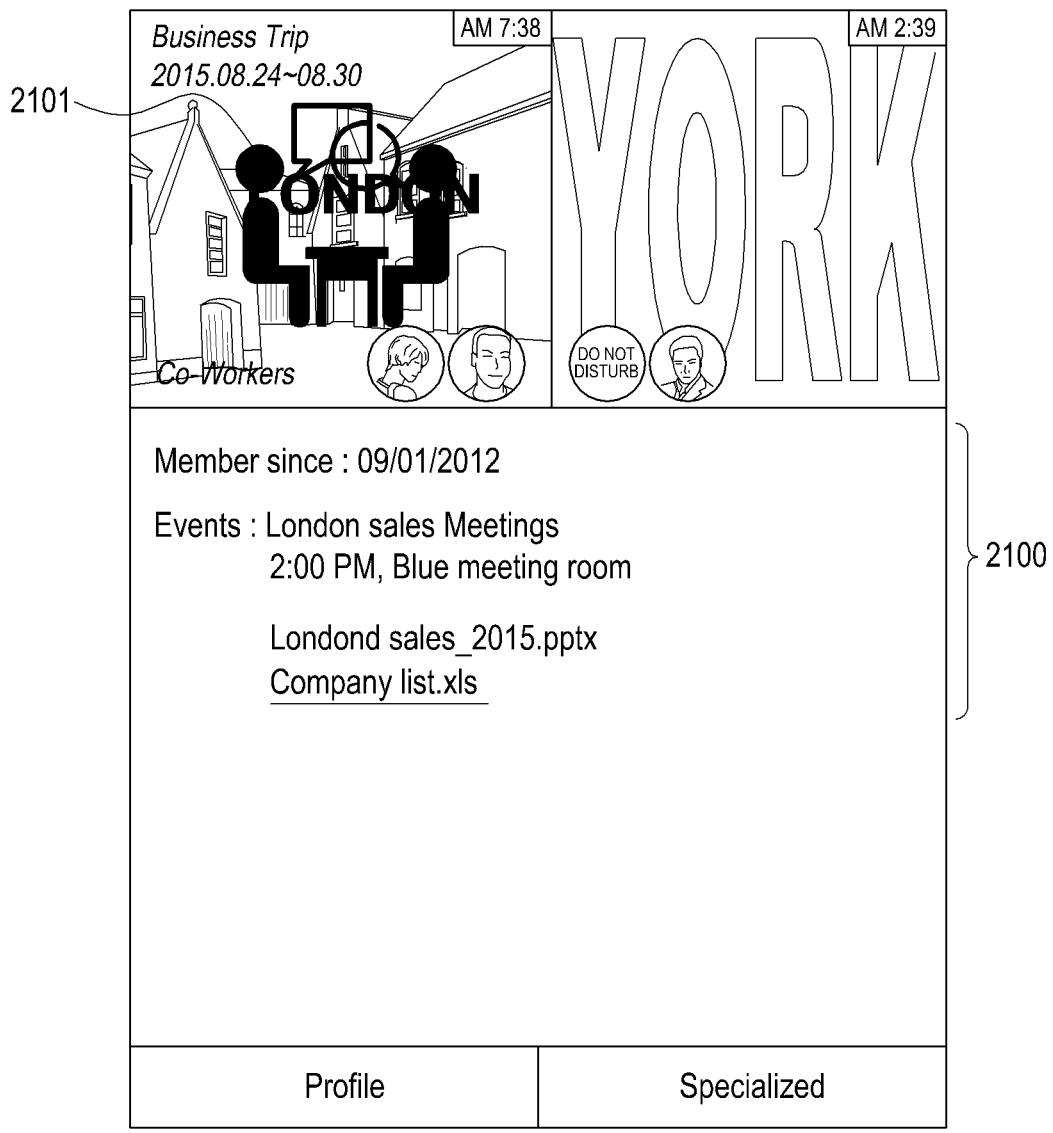

According to FIG. 21, the processor 120 may configure a user interface for sharing location-based information to share information between group members corresponding to a particular location based on pieces of location information of the group members. For example, the processor 120 may configure a user interface 2100 to share a meeting file between only group members of which location information corresponds to a "conference room" among group members of a particular group (for example, office (co-worker) group) within a group profile.

According to an embodiment, the processor 120 may set a security level for group members such as public/private, and provide the user interface 2100 for sharing the meeting file only to group members of which location information corresponds to the "conference room" and does not provide the user interface 2100 to the other group members among all the group members.

According to an embodiment, the processor 120 may generate a new group (for example, a file sharing group) including group members of which location information corresponds to the "conference room" among the group members and provide the user interface 2100 for sharing the meeting file only with group members of the generated group.

For example, the processor 120 may include a user interface 2100 for generating a group of group members who join a meeting among group members of the office group and providing a meeting file within a group profile user interface for the generated group.

Further, when pieces of location information of group members of the office group are the same as each other as the "conference room", the processor 120 may configure a group profile user interface to display a conference image 2101 related to the "conference room" on a representative image.

Figure 22:
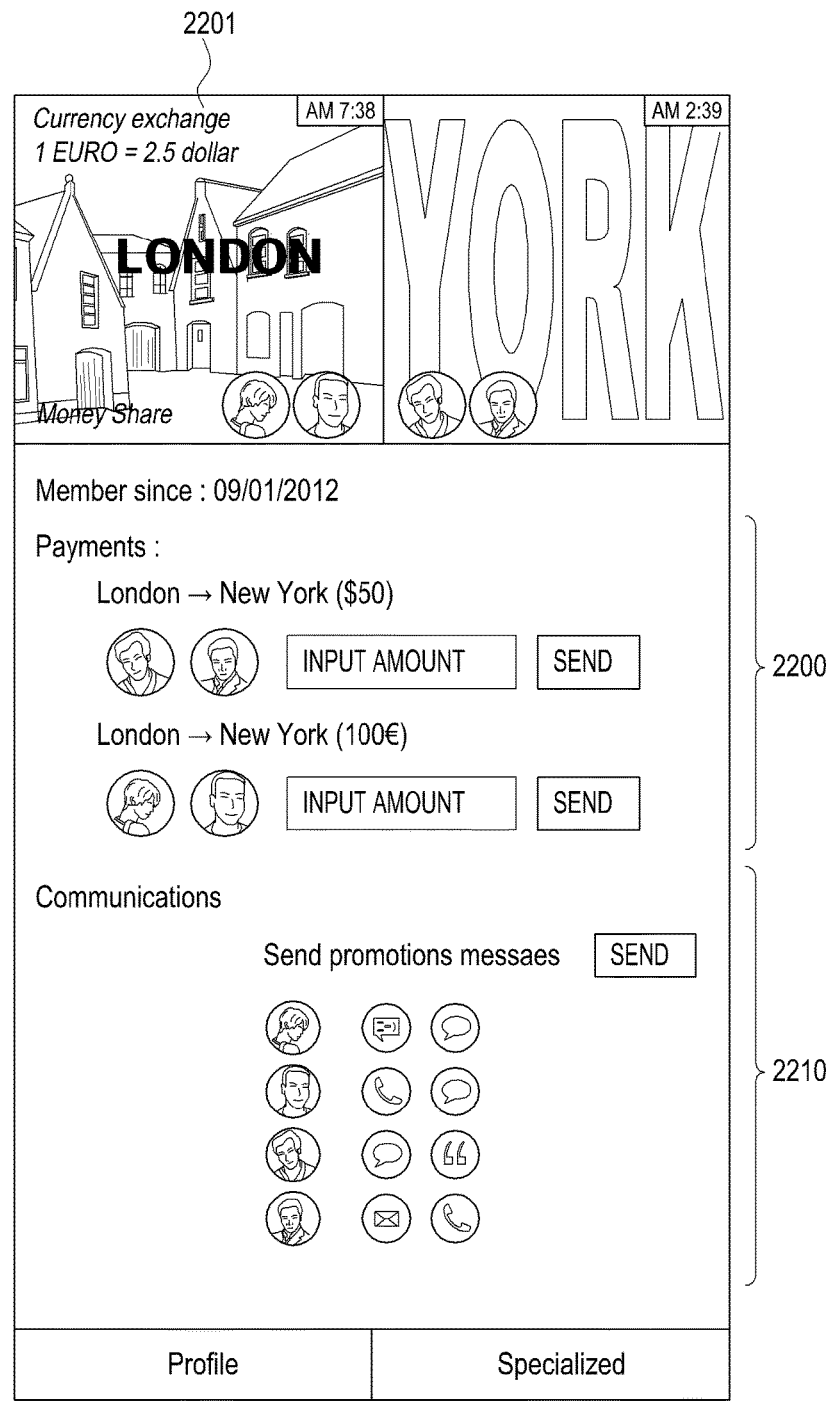

According to FIG. 22, the processor 120 may provide a user interface for a remittance service function and an advertisement service function between group members of a particular group generated for the purpose of business.

According to an embodiment, the processor 120 may configure a user interface 2200 for generating a group (for example, a money sharing group) including users who transfer money from London to New York or from New York to London and providing a function for switching overseas remittance to domestic remittance by integrating accounts of the group members of the generated group. For example, when a first group member in London desires to transfer 50 dollars to New York and a second group member in New York desires to transfer 32 pounds to London, the processor 120 may configure a user interface 2200 for a function to transfer 50 dollars within New York and transfer 32 pounds within London in order to not pay a remittance charge of the overseas remittance by the first group member and the second group member.

Further, the processor 120 may configure a group profile user interface to display exchange rate information 2201 on a representative image of the money sharing group.

According to an embodiment, the processor 120 may configure a user interface 2210 that provides a function for transmitting promotion information to particular group members. For example, the processor 120 may configure a user interface 2210 for generating a group including users for the purpose of promotion and transmitting promotion information at once through a communication means (for example, SNS, SMS, messenger, call, or mail) frequently used by members of the generated group. As described above, according to an embodiment of the present disclosure, a user interface including a specialized function which is meaningful to the group members based on a group profile may be provided.

FIGS. 23A and 23B illustrate examples of group relation information used to generate a group according to various embodiments.

According to FIGS. 23A and 23B, the processor 120 may recommend or generate targets having a correlation according to a preset condition as a group based on group relation information of a plurality of users (for example, context information such as relationship information with a particular user, a call, a planner, logs of a photo album, and an SNS history).

According to an embodiment, when the group generation device is a mobile device, the group relation information may additionally include physical information such as a use pattern of an application such as a calendar or a messenger and whether to access the same Wi-Fi network.

According to an embodiment, the processor 120 may receive group relation information from a plurality of users, collect the received group relation information, and classify the collected group relation information in the form as illustrated in FIGS. 23A and 23B.

The processor 120 may detect users having a correlation among the plurality of users based on reference information of the classified group relation information for recommending a particular user as a group member and determine or recommend the detected users as members of the particular group.

For example, the reference information may include information shown in Table 7 below.

TABLE 7

| Personal profile information | Relationship | Parent, father, school, and friends . . . |
|---|---|---|
| Native application linkage | Planner | Event participant |
| | Messenger | Instant chatting group and analyze of appellation during chatting |

According to an embodiment, the processor 120 may detect users having a correlation based on relationship information of a plurality of users, event participants stored in a planner, a chatting group on a messenger, and analysis of appellation during a chatting. For example, when a first user uses an appellation of "father" for a second user during a chatting of the messenger, the processor 120 may determine that the first user and the second user have a correlation therebetween and decide or recommend the first user and the second user as family group members.

When users having a correlation are not detected based on first reference information, the processor 120 may detect users having a correlation among the plurality of users based on additional reference information and decide or recommend the detected users as group members.

For example, for the family group, the additional reference information may include information shown in Table 8 below.

TABLE 8

| Profile information | Name |
| | Address |
| | Phone number |
| | Anniversary |
| Native application linkage | Wi-Fi access log |
| | Phone call |
| | Photo album |

TABLE 8-continued

| Application | Whether application is used or not |
|---|---|
| Communication log | Contact frequency |

According to an embodiment, the processor 120 may analyze personal profile information such as a name, an address, whether to store a phone number, and an anniversary and analyze a use log of the electronic device such as the same Access Point (AP) or Wi-Fi access log, a phone call, a shared photo, and a use log of an application of a group concept (for example, group chatting, calendar sharing, and face recognized photo), so as to detect users having a correlation. For example, when home addresses of a first user and a second user are the same and logs of the access to the same Wi-Fi address is identified, the processor 120 may determine that the first user and the second user have the correlation and decide or recommend the first user and the second user as family group members.

FIGS. 24A to 26B illustrate examples for determining group members and generating a group including the determined group members according to various embodiments.

According to an embodiment, in an electronic device of a first user, the processor 120 may analyze group relation information of a plurality of users based on reference information to generate a group and decide or recommend users having a correlation among the plurality of users as group members.

Figure 24B:
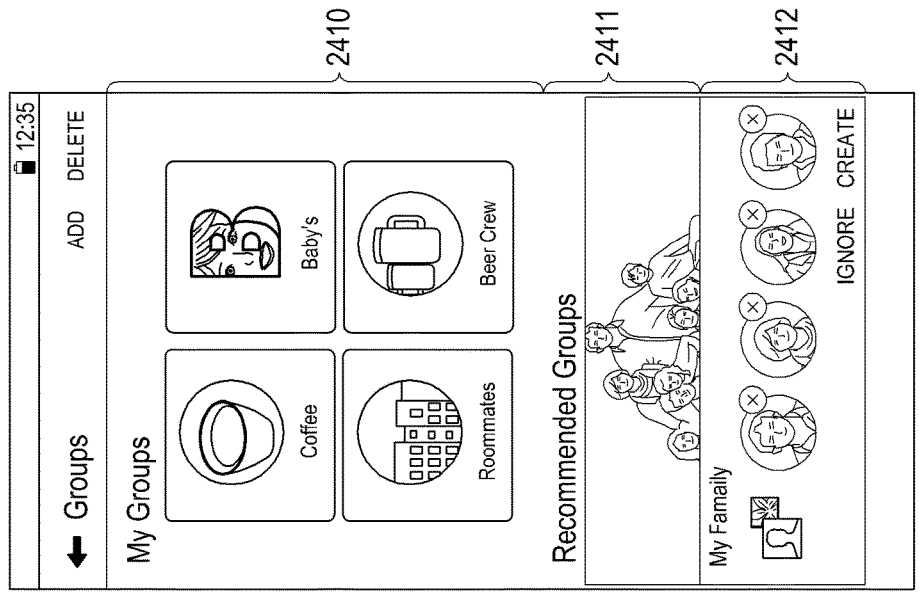
FIGS. 24A to 26B illustrate examples for determining group members and generating a group including the determined group members according to various embodiments.
Figure 24A:
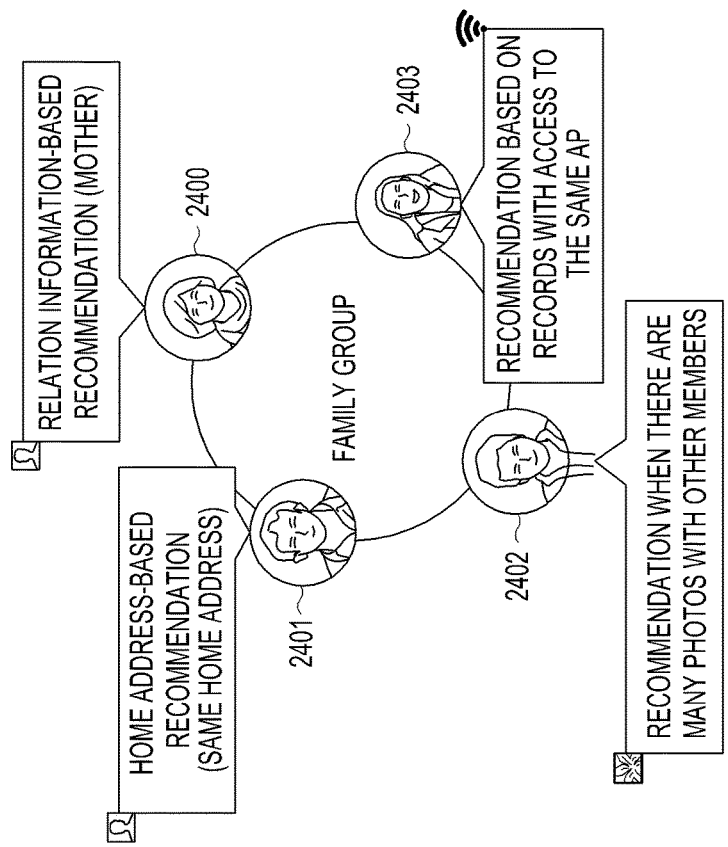

As illustrated in FIG. 24A, when relation information of a second user 2400 corresponds to "mother" based on analysis of the group relation information, the processor 120 may recommend the second user 2400 as a group member of the group "family". When a home address of the first user and a home address of a third user 2401 are the same based on the analysis of the group relation information, the processor 120 may recommend the third user 2401 as the group member of the group "family". When a fourth user 2402 has many photos taken with the first user, the second user 2400, and the third user 2401 based on the analysis of the group relation information, the processor 120 may recommend the fourth user 2402 as the group member of the group "family". When there is a log in which a fifth user 2403 has accessed the same AP as that of the first user based on the analysis of the group relation information, the processor 120 may recommend the fifth user 2403 as the group member of the group "family".

As illustrated in FIG. 24B, the processor 120 may configure a user interface including an area 2410 for selecting a group image that represents a group to generate the group, an area 2411 indicating a recommended group, and an area 2412 for displaying recommended group member. For example, when a group image of the recommend group "family" is selected and selection by addition or deletion of members of the recommended group "family" is completed, the processor 120 may generate the group "family" based on such information.

According to an embodiment, the processor 120 may detect users having a correlation between a plurality of users based on reference information for recommending a particular user as a member of an office group or additional reference information, and decide or recommend the detected users as members of the office group.

For example, for the office group, the additional reference information may include information shown in Table 9 below.

TABLE 9

| Profile information | Address |
| --- | --- |
|  | Phone number |
|  | Department |
|  | Job |
|  | Organization |
|  | Email |
|  | Anniversary |
| Native application linkage | Wi-Fi access |
|  | Phone call |
| Application use log | Security program use log |
|  | Email use log |
|  | Application use log |
| Communication log | Call/message frequency |

According to an embodiment, the processor 120 may analyze profile information such as an address, department, job, organization, email, and anniversary and analyze a use log of the electronic device such as the same AP or Wi-Fi access log, a phone call log, an application use log (for example, security program, email, group chatting, scheduler, and face recognized photo), and a communication log, so as to detect users having a correlation. For example, when office addresses and departments of the first user and the second user are the same and a log in which the first user and the second user have participated on the same schedule is identified, the processor 120 may determine that the first user and the second user have a correlation and decide or recommend the first user and the second user as office group members.

Figure 25B:
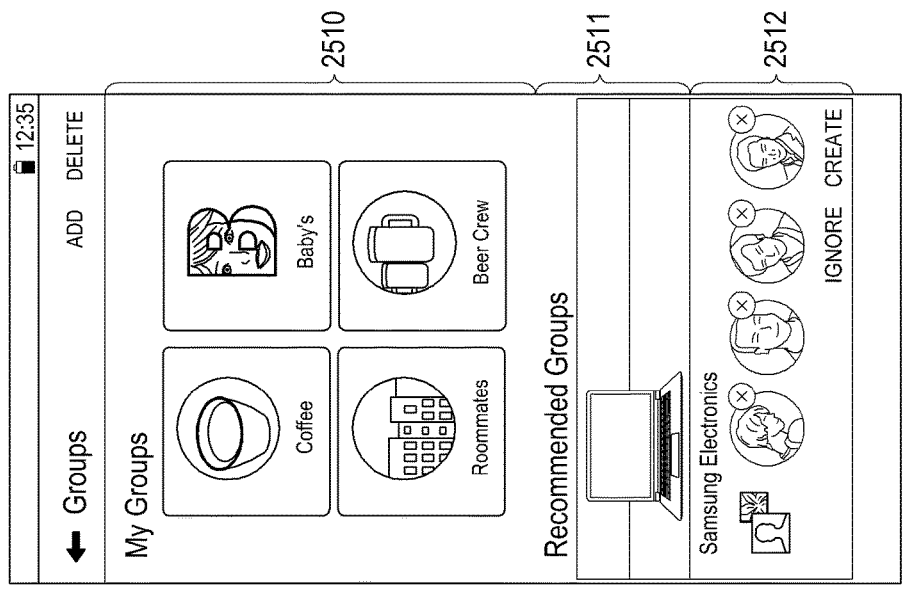
Figure 25A:
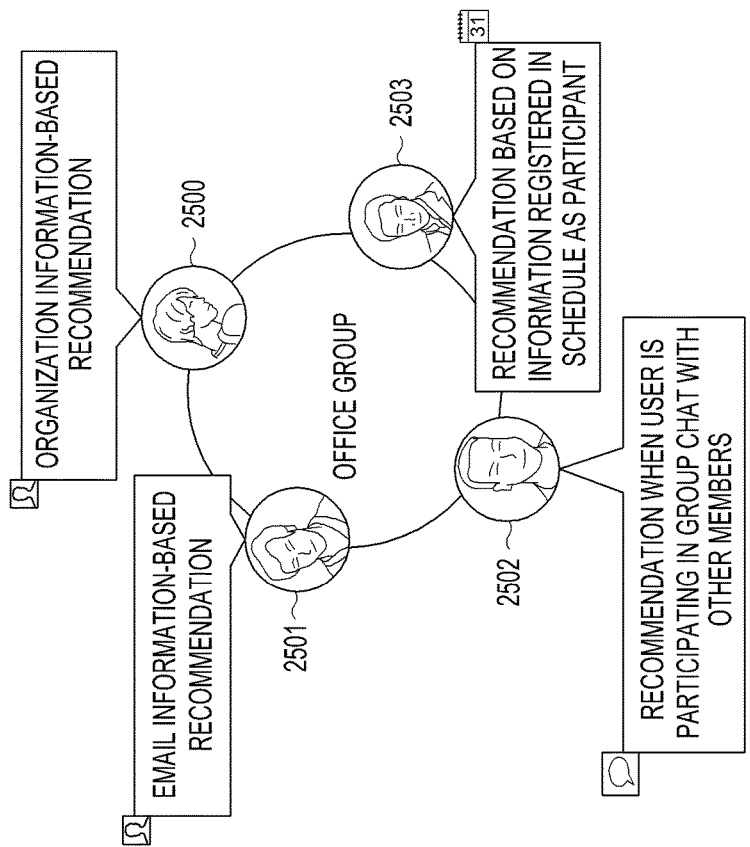

As illustrated in FIG. 25A, when organization information of a second user 2500 is the same as organization information of a first user based on analysis of group relation information, the processor 120 of the electronic device of the first user may recommend the second user 2500 as a group member of the group "office". When an email account of the first user and an email account of a third user 2501 are the same based on the group relation information, the processor 120 may recommend the third user 2501 as the group member of the group "office". When there is a log in which the fourth user 2502 has participated in a group chatting with the first user, the second user 2500, and the third user 2501 based on the analysis of the group relation information, the processor 120 may recommend the fourth user 2502 as the group member of the group "office". When there is a log in which a fifth user 2503 has registered as the participant of the office schedule based on the analysis of the group relation information, the processor 120 may recommend the fifth user 2503 as the group member of the group "office".

As illustrated in FIG. 25B, the processor 120 may configure a user interface including an area 2510 for selecting a group image that represents a group to generate the group, an area 2511 indicating a recommended group, and an area 2512 for displaying recommended group member. For example, when a group image of a recommended group "office" is selected and selection by addition or deletion of members of the recommended group "office" is completed, the processor 120 may generate the group "office" based on such information.

According to an embodiment, the processor 120 may detect users having a correlation between a plurality of users based on reference information for recommending a particular user as a member of a school friend group or additional reference information, and decide or recommend the detected users as members of the school friend group.

Figure 26B:
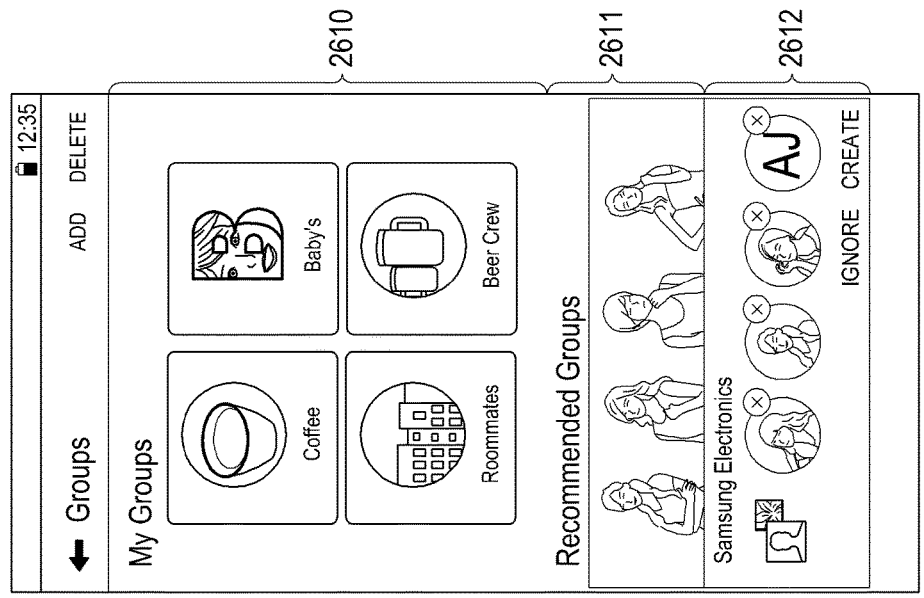
Figure 26A:
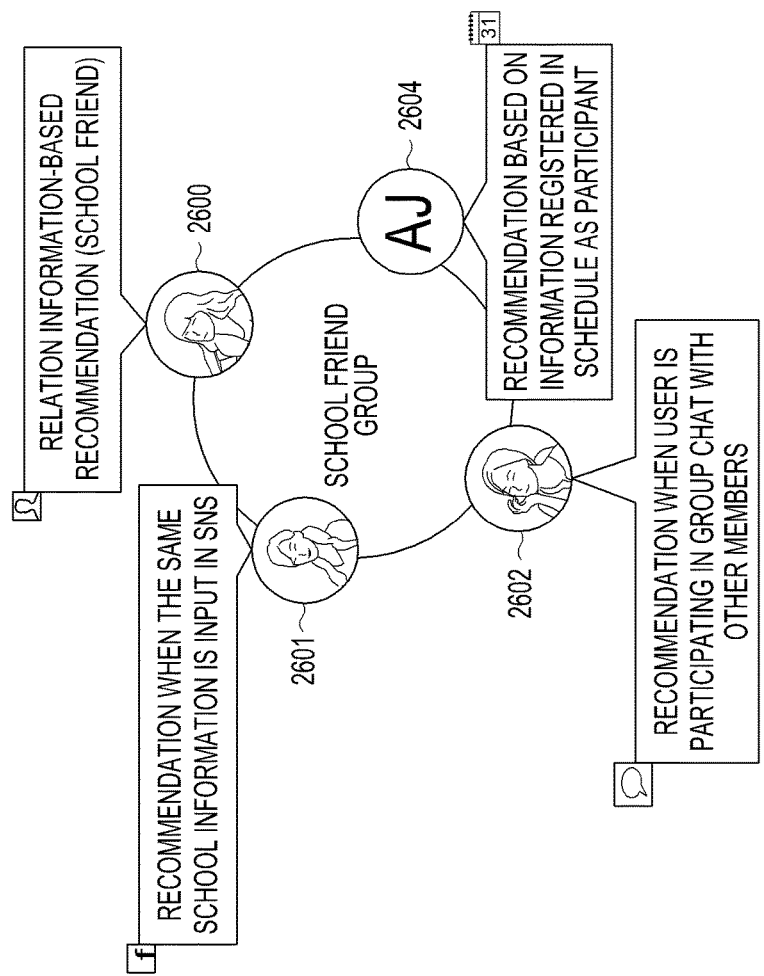

As illustrated in FIG. 26A, when relationship information of a second user 2600 corresponds to "school friend" based on analysis of group relation information, the processor 120 of the electronic device of the first user may recommend the second user 2600 as a group member of the group "school friend". When school information registered in an SNS account of the first user and school information registered in an SNS account of a third user 2601 are the same based on the analysis of the group relation information, the processor 120 may recommend the third user 2601 as a group member of the group "school friend". When there is a log in which a fourth user 2602 has participated in a group chatting with the first user, the second user 2600, and the third user 2601 based on the analysis of the group relation information, the processor 120 may recommend the fourth user 2602 as the group member of the group "school friend". When there is a log in which a fifth user 2604 has been registered in a school schedule as the participant based on the analysis of the group relation information, the processor 120 may recommend the fifth user 2604 as the group member of the group "school friend".

As illustrated in FIG. 26B, the processor 120 may configure a user interface including an area 2610 for selecting a group image that represents a group to generate the group, an area 2611 indicating a recommended group, and an area 2612 for displaying recommended group member. For example, when a group image of the recommended group "school friend" is selected and selection by addition or deletion of members of the recommended group "school friend" is completed, the processor 120 may generate the group "school friend" based on such information.

According to an embodiment, the processor 120 may recommend groups which are determined to be meaningful to users other than the groups "family", "office", and "school friend" based on the analysis of the group relation information.

According to an embodiment, when a plurality of users are selected to generate a group by a user through the input/output interface 150, the processor 120 may transmit a group participation request to electronic devices used by the plurality of selected users and, when a response to the request is received, generate a particular group including users who accept the request.

According to an embodiment, the processor 120 may generate a group or a group profile which can be identified by only the user who made a request for generating the group or the group profile.

According to an embodiment, when a group member of a particular group is added or deleted, the processor 120 may update a group profile of the particular group and update a user interface corresponding to the updated group profile. For example, when a younger brother in a family group including mother, father, me, and husband is added, the processor 120 may display an icon "New" on a profile photo of the added younger brother, search for a photo including mother, father, me, and husband, and update a user interface to display the found photo as a representative image. When mother, father, and younger brother are deleted from the family group, the processor 120 may delete profile photos of mother, father, and younger brother, search for a photo including me and husband, and update the user interface to display the found photo as the representative image.

As described above, according to various embodiments of the present disclosure, when the electronic device makes a request for generating a profile related to a group including a plurality of users who use different devices, the electronic device may acquire a set of information related to at least some of the plurality of users and generate the profile related to the group based on the acquired set of information, such that the user may receive various pieces of information on the group.

According to various embodiments of the present disclosure, even though the user does not accurately recognize information on members of each group, the user can receive desired information since a group profile is generated based on information acquired from the members of each group.

According to various embodiments of the present disclosure, even though members of the group do not individually generate group profiles, the group members can receive optimum group profiles.

According to various embodiments of the present disclosure, various group services can be provided through group profiles generated between group members.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a communication module;
   a processor electrically connected to the communication module; and
   a memory electrically connected to the processor,
   wherein the memory is configured to store instructions, that when executed, instruct the processor to:
      receive, from a first external device, a request for generating information related to a group including a plurality of users using different electronic devices through the communication module,
      receive, from the first external device and a second external device, group relation information related to at least some of the plurality of users, wherein the second external device in a same group with the first external device,
      generate a group profile and data to be display in a user interface with respect to the at least some of the plurality of users based on at least some of the received group relation information, wherein the data includes a group name with respect to the at least some of the plurality of users, relationship information of the at least some of the plurality of users, and additional information of each of the at least some of the plurality of users, and
      transmit the generated group profile and the data to the first external device and the second external device, through the communication module.

2. The electronic device of claim 1, further comprising instructions, that when executed, instruct the processor to:
   receive an update request for the group from the first external device,
   update information with respect to the group in response to the received update request,
   change at least some of the generated group profile and user interface to correspond to the at least partially updated information with respect to the group, and
   transmit the at least partially updated group profile and user interface to the first external device.

3. The electronic device of claim 1, further comprising instructions, that when executed, instruct the processor to:
   assign a weighted value to each of at least some of the received group relation information, and
   identify at least some of the received group relation information comprising a weighted value larger than or equal to a preset weighted value, as a set of the information with related to the group.

4. The electronic device of claim 1, further comprising a display, and instructions, that when executed, instruct the processor to display the generated user interface based on the received group relation information on the display.

5. The electronic device of claim 4, wherein the user interface corresponds to the group profile of the plurality of users.

6. An electronic device comprising:
   at least one communication module;
   a display;
   a processor electrically connected to the at least one communication module and the display; and
   a memory electrically connected to the processor,
   wherein the memory is configured to store instructions, that when executed, instruct the processor to:
      transmit a request for generating a group profile of a plurality of users who use different electronic devices to an external device through the at least one communication module,
      transmit personal profiles of at least some of the plurality of users to the external device through the at least one communication module,
      receive a group profile and data related to a user interface with respect to the at least some of the plurality of users from the external device through the communication module, in response to transmission of the personal profiles of the at least some of the plurality of users, and
      display the user interface based on at least some of the received data in the display,
   wherein the user interface includes a group name with respect to the at least some of the plurality of users, relationship information of the at least some of the plurality of users, and additional information of each of the at least some of the plurality of users.

7. The electronic device of claim 6, further comprising instructions, that when executed, instruct the processor to:
   transmit a request for updating the group profile to the external device, and
   receive other data related to the at least one user interface at least partially changed to correspond to the updated group profile from the external device through the at least one communication module.

8. The electronic device of claim 7, further comprising instructions, that when executed, instruct the processor to display the at least partially changed user interface based on at least some of the received other data on the display.

9. The electronic device of claim 1, further comprising instructions, that when executed, instruct the processor to:
   receive a request for personal profiles of the at least some of a plurality of users from the first external device,
   retrieve a personal profile from among the at least some personal profiles stored in the memory, and
   transmit the retrieved personal profile to the first external device.

10. The electronic device of claim 9, further comprising instructions, that when executed, instruct the processor to:
   receive a request for updating of the least some personal profiles from the first external device,
   update at least some of the personal profiles stored in the memory, in response to the received request,
   change at least some group profiles related to the personal profiles of the at least partially updated first external device, and
   transmit data corresponding to the at least partially updated group profiles to the first external device.

11. A method of providing a group profile, the method comprising:
- receiving a request, for generating information related to a group including a plurality of users who use different electronic devices, from a first external device;
- receiving group relation information related to at least some of the plurality of users, from the first external device and a second external device in which is a same group with the first external device;
- generating a group profile and data to be display in a user interface with respect to the at least some of the plurality of users based on at least some of the received group relation information, wherein the data includes a group name with respect to the at least some of the plurality of users, relationship information of the at least some of the plurality of users, and additional information of each of the at least some of the plurality of users; and
- transmitting the generated group profile and the generated user interface to the first external device and the second external device.

12. The method of claim 11, further comprising:
- receiving a update request for the group from the first external device;
- updating information with respect to the group in response to the received update request;
- changing at least some of the generated group profile and user interface to correspond to the at least partially updated information with respect to the group; and
- transmitting the at least partially updated group profile and user interface to the first external device.

13. The method of claim 11, wherein the generating of the group profile comprises:
- assigning a weighted value to each of at least some of the received group relation information; and
- identifying at least some of the received group relation information comprising a weighted value larger than or equal to a preset weighted value as a set of the information with related to the group.

14. The method of claim 11, further comprising displaying the generated user interface at least partially based on the received group relation information on a display.

15. The method of claim 14, wherein the user interface corresponds to the group profile of the plurality of users.

16. A method of providing a group profile, the method comprising:
- transmitting a request for generating a group profile of a plurality of users who use different electronic devices to an external device;
- transmitting personal profiles of at least some of the plurality of users to the external device;
- receiving a group profile and data related to a user interface with respect to the at least some of the plurality of users from the external device through the communication module, in response to transmission of the personal profiles of the at least some of the plurality of users; and
- displaying the user interface based on at least some of the received data in the display,
- wherein the user interface includes a group name with respect to the at least some of the plurality of users, relationship information of the at least some of the plurality of users, and additional information of each of the at least some of the plurality of users.

17. The method of claim 16, further comprising:
- transmitting a request for updating the group profile to the external device; and
- receiving other data related to the user interface at least partially changed to correspond to a group profile updated based on the transmitted request from the external device.

18. The method of claim 17, further comprising displaying the at least partially changed user interface based on at least some of the received other data in the display.

19. The method of claim 11, further comprising:
- receiving a request for personal profiles of the at least some of a plurality of users from the first external device;
- retrieving a personal profile from among the at least some of the personal profiles stored in a memory; and
- transmitting the retrieved personal profile to the first external device.

20. The method of claim 19, further comprising:
- receiving a request for updating of the at least some of the personal profiles from the first external device;
- updating at least some of the personal profiles stored in the memory, in response to the received request;
- changing at least some of the group profiles related to the at least partially updated personal profiles of the first external device; and
- transmitting data corresponding to the at least partially updated group profiles to the first external device.

* * * * *